US011290498B2

(12) United States Patent
Soroush et al.

(10) Patent No.: US 11,290,498 B2
(45) Date of Patent: Mar. 29, 2022

(54) SYSTEM AND METHOD FOR GENERATING EVIDENCE FOR THE SUPERIORITY OF A DISTRIBUTED SYSTEM CONFIGURATION

(71) Applicant: Palo Alto Research Center Incorporated, Palo Alto, CA (US)

(72) Inventors: Hamed Soroush, San Jose, CA (US); Shantanu Rane, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 15 days.

(21) Appl. No.: 16/925,063

(22) Filed: Jul. 9, 2020

(65) Prior Publication Data

US 2021/0014283 A1 Jan. 14, 2021

Related U.S. Application Data

(60) Provisional application No. 62/873,746, filed on Jul. 12, 2019.

(51) Int. Cl.
*H04L 29/06* (2006.01)
*G06F 21/57* (2013.01)
*G06F 16/25* (2019.01)
*G06N 5/04* (2006.01)
*G06N 3/04* (2006.01)

(52) U.S. Cl.
CPC .......... *H04L 63/205* (2013.01); *G06F 16/252* (2019.01); *G06F 21/577* (2013.01); *G06N 3/04* (2013.01); *G06N 5/04* (2013.01); *H04L 63/1433* (2013.01); *G06F 2221/034* (2013.01)

(58) Field of Classification Search
CPC ... H04L 63/205; H04L 63/1433; H04L 63/20; G06F 21/57; G06F 21/577; G06F 21/70; G06F 21/71; G06F 21/78
See application file for complete search history.

(56) References Cited

U.S. PATENT DOCUMENTS

| | | | |
|---|---|---|---|
| 2013/0232331 A1* | 9/2013 | Farhan | G06F 9/4401 713/100 |
| 2016/0050116 A1* | 2/2016 | Sheshadri | H04L 67/10 709/221 |
| 2017/0195349 A1* | 7/2017 | Shabtai | H04L 63/1433 |

* cited by examiner

*Primary Examiner* — Edward Zee
(74) *Attorney, Agent, or Firm* — Shun Yao; Yao Legal Services, Inc.

(57) ABSTRACT

The system generates evidence of a recommended configuration for a distributed system based on a plurality of configuration parameters. The system displays, on a screen of a user device, the evidence, which includes a list of configuration parameters, including a name, a current value, and a recommended value for a respective configuration parameter. The recommended value is obtained based on a strategy for optimizing security, functionality, or both. The system further displays interactive elements which allow the user to: view a resolution of a pair of mutually incompatible constraints resulting in the recommended value for the respective configuration parameter, wherein the resolution includes a name of the configuration parameter removed from the list and a reason for the removal; and view information associated with each of the pair of mutually incompatible constraints, wherein the information includes a name, a goal, a security impact, and a description of the constraint.

20 Claims, 20 Drawing Sheets
(3 of 20 Drawing Sheet(s) Filed in Color)

| SYSTEM OPTION | VALUE |
|---|---|
| MAX NUMBER OF REASONING ROUNDS 408 | 10 |
| MODELING FRAMEWORK FQDN 412 | helsinki.local |
| MODELING FRAMEWORK USERNAME 416 | neo4j |
| CONSTRAINT RELAXATION STRATEGY 420 | 1 |
| SYSTEM OUTPUT DIRECTORY 424 | /sciborg-output |
| SYSTEM REPORTING DIRECTORY 428 | /sciborg-output/report |
| SOLVER OUTPUT DIRECTORY 432 | /sciborg-output/solver |

FIG. 4A

| CRS ID / VALUE | CONSTRAINT RELAXATION STRATEGY |
|---|---|
| ID 0 | IMPROVE CURRENT CONFIGURATION WITHOUT USING CONSTRAINT PRIORITIZATION |
| ID 1 | IMPROVE CURRENT CONFIGURATION, PRIORITIZE FUNCTIONALITY |
| ID 2 | IMPROVE CURRENT CONFIGURATION, PRIORITIZE SECURITY |

FIG. 4B

| NUMBER OF COMPONENTS | NUMBER OF PARAMETERS | NUMBER OF CONSTRAINTS | NUMBER OF VULNERABILITIES |
|---|---|---|---|
| 23 | 221 | 53 | 9 |

FIG. 4C

| | PARAMETER NAME | CURRENT VALUE | SUGGESTED VALUE |
|---|---|---|---|
| 478 | NAME 1 = "hass1.sw.logbook.e2fcef5e_d4da_4e55_b23f_ea091a836809.logbook.exclude.entities" | "'exclude_sensor.last_boot'", "'exclude_sensor.date'" | "exclude_sensor.last_boot" |
| 480 | NAME 2 = "hass1.sw.logbook.e2fcef5e_d4da_4e55_b23f_ea091a836809.logbook.include.domains" | "'include_sun'", "'include_weblink'" | "include_weblink" |
| 482 | NAME 3 = "openwrt1.firewall.zone.aecbc76c_d7a4_4ae7_a64f_3b5de953d1fe.network" | wan, wan6 | "wan" |
| 484 | NAME 4 = "openwrt1.system.timeserver_ntp.7d76b7c7_0c7e_4a8c_8cb812dbd293f27e.server" | 1.openwrt.pool.ntp.org, 2.openwrt.pool.ntp.org, 0.openwrt.pool.ntp.org, 3.openwrt.pool.ntp.org, | "1.openwrt.pool.ntp.org" |
| 486 | NAME 5 = "openwrt1.firewall.rule.07cbf46b_1cc8_41cd_91e8_0716043edffa.icmp_type" | 130/0, 143/0, 132/0, 131/0 | "131/0" |

| From FIG. 4D-1 | | |
|---|---|---|
| 488 { NAME 6 = "hass1.sw.logbook.e2fcef5e_d4da_4e55_b23f_ea091a836809.logbook.include.entities" | "'include_sensor.last_boot'", "'include_sensor.date'" | "include_sensor.last_boot" |
| 489 { NAME 7 = "openwrt1.firewall.rule.2b7f55bb_ca43_489f_ab95_8e94632095e3.icmp_type" | echo-request, echoreply, packet-too-big, badheader, neighbouradvertisement, timeexceeded, neighboursolicitation, routersolicitation, destinationunreachable, unknownheader-type, routeradvertisement | "packet-too-big" |

FIG. 4D-2

| PARAMETER NAME | CURRENT VALUE | SUGGESTED VALUE |
|---|---|---|
| NAME 8 = "hass1.sw.http.c5ae3875_0b3a_4b34_91b6_f4403cf8424c.http.trusted_networks" | ""0.0.0.0/0"" | "" |
| NAME 9 = "openwrt1.firewall.rule.6c781db1_0f51_4759_923a_cb33f5186be9.icmp_type" | time-exceeded, echoreply, destinationunreachable, packet-too-big, echo-request, badheader, unknown-header-type | "echoreply" |
| NAME 10 = "adobesecurityhub1.sw.adobepy.2f77b301_d506_4af4_ad3e_bfc9d636b989.beeper_mute" | 1 | 0  VIEW MORE INFO... |
| NAME 11 = "hass1.sw.logbook.e2fcef5e_d4da_4e55_b23f_ea091a836809.logbook.exclude.domains" | ""exclude_sun"", "exclude_weblink"" | "exclude_weblink" |

FIG. 4E

| 502 | 504 | 506 | 508 |
|---|---|---|---|
| ROUND NUMBER | ALL CONSTRAINTS MUTUALLY SATISFIED | HAS MODEL / UNSAT CORE EMPTY | CURRENTLY COMPARING PAIR OF MUTUALLY INCOMPATIBLE CONSTRAINTS OF UNSAT CORE |
| 1 | FALSE | FALSE | FALSE |

| 510 | 512 | 514 | 516 |
|---|---|---|---|
| CONSTRAINT NAME | CONSTRAINT GOAL | CONSTRAINT SECURITY IMPACT | CONSTRAINT |
| 522 N/A | 524 N/A | N/A | N/A |

| 518 | | | 520 |
|---|---|---|---|
| NAME OF CONSTRAINT DROPPED (FROM PRIOR ROUND'S UNSAT CORE) | | | REASON OR RATIONALE FOR DROPPING CONSTRAINT |
| 526 N/A | | | 528 N/A |

FIG. 5A

SYSTEM AND METHOD FOR GENERATING EVIDENCE FOR THE SUPERIORITY OF A DISTRIBUTED SYSTEM CONFIGURATION

RELATED APPLICATIONS

This application claims the benefit of:
U.S. Provisional Application No. 62/873,746, entitled "System and Method for Improving the Security Versus Functionality Tradeoff of a Composed Internet of Things System," by inventors Hamed Soroush and Shantanu Rane, filed 12 Jul. 2019, which subject matter is related to the subject matter in
U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 (hereinafter "U.S. patent application Ser. No. 16/219,774"), which application claims the benefit of
U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to
U.S. patent application Ser. No. 16/918,966, entitled "SYSTEM AND METHOD FOR EXTRACTING CONFIGURATION INFORMATION FOR REASONING ABOUT THE SECURITY AND FUNCTIONALITY OF A COMPOSED INTERNET OF THINGS SYSTEM," by inventors Hamed Soroush, Milad Asgari Mehrabadi, Shantanu Rane, and Marc Mosko, filed on 1 Jul. 2020 (hereinafter "U.S. patent application Ser. No. 16/918,966");
U.S. patent application Ser. No. 16/918,971, entitled "SYSTEM AND METHOD FOR CONSTRUCTING A GRAPH-BASED MODEL FOR OPTIMIZING THE SECURITY POSTURE OF A COMPOSED INTERNET OF THINGS SYSTEM," by inventors Hamed Soroush, Milad Asgari Mehrabadi, and Shantanu Rane, filed on 1 Jul. 2020 (hereinafter "U.S. patent application Ser. No. 16/918,971"); and
U.S. patent application Ser. No. 16/923,763, entitled "SYSTEM AND METHOD FOR REASONING ABOUT THE OPTIMALITY OF A CONFIGURATION PARAMETER OF A DISTRIBUTED SYSTEM," by inventors Hamed Soroush and Shantanu Rane, filed on 8 Jul. 2020 (hereinafter "U.S. patent application Ser. No. 16/923,763"),
the disclosures of which are herein incorporated by reference in their entirety.

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

BACKGROUND

Field

This disclosure is generally related to improving the security versus functionality tradeoff. More specifically, this disclosure is related to a system and method for generating evidence for the superiority of a distributed system configuration.

Related Art

As cybersystems become increasingly complex and connected, configuration analytics may play a critical role in the correct and secure operation of cybersystems or composed systems (e.g., a networked Industrial Control System (ICS) or an Internet of Things (IoT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Current solutions may focus narrowly on tuning the configuration parameters of individual system components. However, these solutions lack a principled approach to managing the complex relationships between the configuration parameters of the many components of a composed system, and do not leverage the complex relationships among the configuration parameters of the individual system components. These solutions do not account for the dependencies among the configuration parameters of the interconnected system components or devices. Furthermore, current solutions do not provide a principled approach to account for the effect of configuration parameters on the attack sequences that are available to an adversary, nor do they provide functional dependencies between the interconnected system components or devices.

SUMMARY

The embodiments described herein provide a system and method for generating evidence for the superiority of a distributed system configuration. During operation, the system generates, by a computing system, evidence of a recommended configuration for a distributed system based on a plurality of configuration parameters. The system displays, on a screen of a user device, the evidence, which includes a list of configuration parameters, including a name, a current value, and a recommended value for a respective configuration parameter, wherein the recommended value is obtained based on a strategy for optimizing security, functionality, or both security and functionality in the distributed system. The system displays, on the screen of the user device, one or more interactive elements which allow the user to: view a resolution of a pair of mutually incompatible constraints resulting in the recommended value for the respective configuration parameter, wherein the resolution includes a name of the configuration parameter removed from the list and a reason for the removal; and view information associated with each of the pair of mutually incompatible constraints, wherein the information includes a name, a goal, a security impact, and a description of the constraint.

In some embodiments, the current value for the respective configuration parameter comprises a first array with current or possible values for the respective configuration parameter used by the distributed system. The recommended value for the respective configuration parameters comprises a second array with recommended values for the respective configuration parameter suggested by the computing system. The second array has fewer elements than the first array.

In some embodiments, the strategy for optimizing security comprises preserving constraints which prioritize security over functionality. The strategy for optimizing functionality comprises preserving constraints which prioritize functionality over security. The strategy for optimizing both security and functionality comprises improving a current configuration of the system without prioritizing security over functionality or functionality over security.

In some embodiments, the reason for removal of the configuration parameter from the pair of mutually incompatible constraints is based on the strategy, the goal of the constraint, and the security impact of the constraint.

In some embodiments, the reason for removal comprises one or more of: a preference for a security best practice; an avoidance of a security bad practice; an avoidance of known security or system vulnerabilities; and a security policy or preference which is predetermined by an operator of the computing system or the distributed system.

In some embodiments, the method further comprises displaying, on the screen of the user device, system settings, including one or more of: a maximum number of reasoning rounds; a fully qualified domain name of a framework used for generating a multi-layer graph; a framework or application used for generating the multi-layer graph; a strategy for relaxing constraints; and one or more output or reporting directories.

In some embodiments, generating the evidence is based on a multi-layer graph which is obtained for the distributed system with a plurality of components. The multi-layer graph comprises a configuration subgraph, a vulnerability subgraph, and a dependency subgraph.

In some embodiments, the system displays, on the screen of the user device, one or more interactive elements which allow the user further to: update a value for a configuration parameter by selecting a recommended value; generate a new multi-layer graph based on the updated value; and view updated evidence based on the new multi-layer graph.

In some embodiments, the system receives a command to generate a new multi-layer graph and to return updated evidence, wherein the command indicates one or more updated values for one or more configuration parameters. The system generates the new multi-layer graph and the updated evidence based on the one or more updated values. The system returns the new multi-layer graph and the updated evidence. The system displays, on the screen of the user device, the updated evidence, which includes an updated list of configuration parameters, including a name, a current value, and a recommended value for a respective configuration parameter, wherein the recommended value is obtained based on a strategy for optimizing security, functionality, or both security and functionality in the distributed system.

In some embodiments, the system computes an unsatisfiable core to obtain the mutually incompatible constraints. The system displays, on the screen of the user device, a resolution of the computed unsatisfiable core, based on the strategy and over multiple iterations. The resolution is obtained by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 2B-1 illustrates an exemplary multi-layer graph corresponding to the network diagram of FIG. 2A, in accordance with an embodiment of the present application.

FIG. 2B-2 illustrates an exemplary multi-layer graph corresponding to the network diagram of FIG. 2A, in accordance with an embodiment of the present application.

FIG. 4A illustrates an exemplary display on a user device, including configurable options for system settings, in accordance with an embodiment of the present application.

FIG. 4B illustrates an exemplary index for possible values for the constraint relaxation strategy of FIG. 4A, in accordance with an embodiment of the present application.

FIG. 4C illustrates an exemplary table listing information corresponding to the multi-layer model on which the reasoning framework and the evidence generation are based, in accordance with an embodiment of the present application.

FIG. 4D-1 illustrates an exemplary list of configuration parameters, including a name, a current value, and a suggested value for a respective configuration parameter, in accordance with an embodiment of the present application.

FIG. 4D-2 illustrates an exemplary list of configuration parameters, including a name, a current value, and a suggested value for a respective configuration parameter, in accordance with an embodiment of the present application.

FIG. 4E illustrates an exemplary list of configuration parameters, including a name, a current value, and a suggested value for a respective configuration parameter, in accordance with an embodiment of the present application.

FIG. 5A depicts an exemplary display for information in each round or iteration presented by the evidence generation framework, in accordance with an embodiment of the present application.

FIG. 5B-1 depicts an exemplary display for information in each round or iteration presented by the evidence generation framework, in accordance with an embodiment of the present application.

FIG. 5B-2 depicts an exemplary display for information in each round or iteration presented by the evidence generation framework, in accordance with an embodiment of the present application.

FIG. 5C-1 depicts an exemplary display for information in each round or iteration presented by the evidence generation framework, in accordance with an embodiment of the present application.

FIG. 5C-2 depicts an exemplary display for information in each round or iteration presented by the evidence generation framework, in accordance with an embodiment of the present application.

FIG. 5D-1 depicts an exemplary display 570 for information in each round or iteration presented by the evidence generation framework, in accordance with an embodiment of the present application.

FIG. 5D-2 depicts an exemplary display 570 for information in each round or iteration presented by the evidence generation framework, in accordance with an embodiment of the present application.

Figure 1:
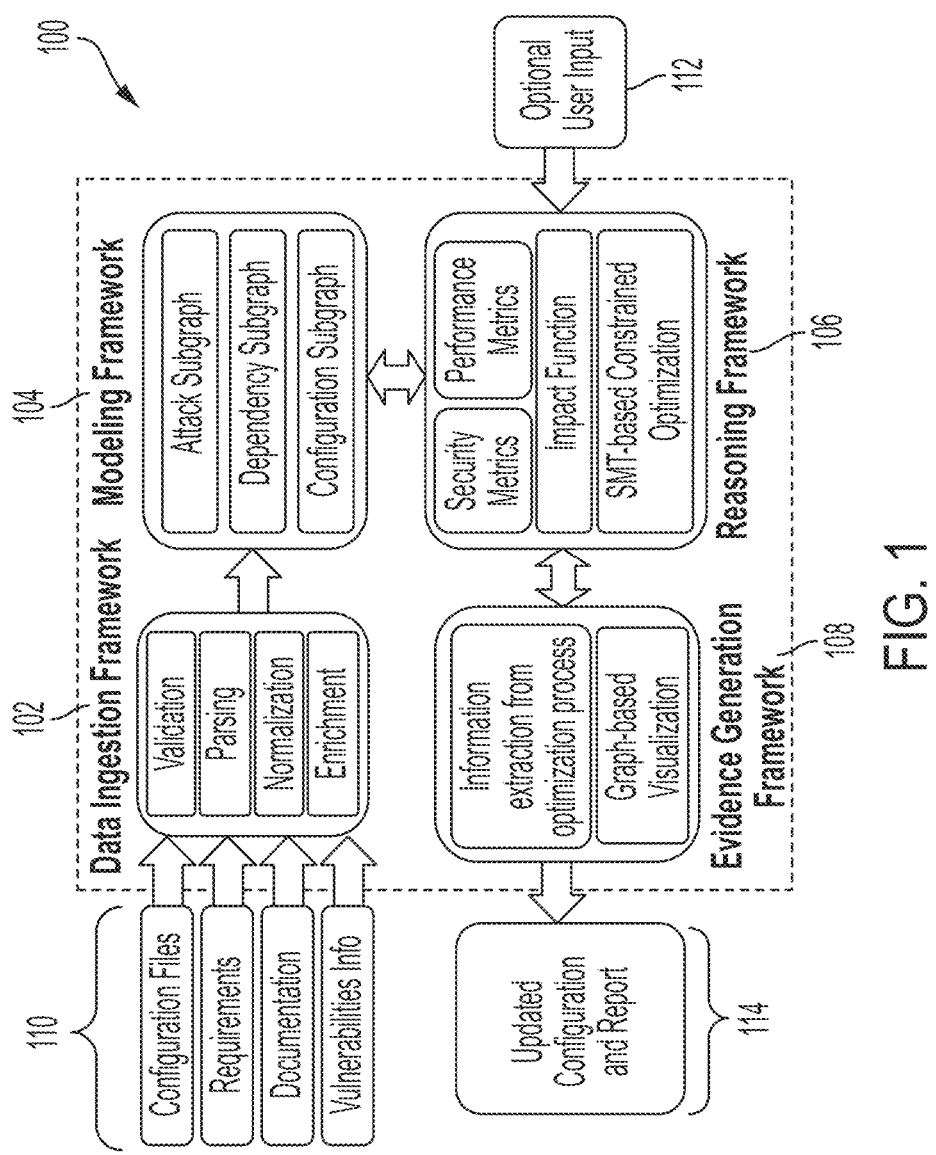
FIG. 1 illustrates an exemplary environment for facilitating an improvement in the security versus functionality tradeoff of a composed system, in accordance with an embodiment of the present application.

In the figures, like reference numerals refer to the same figure elements. A reference to a figure which is split across two figures indicates a reference to the two split figures. For example: references to FIG. 2B indicate references to both FIGS. 2B-1 and 2B-2; references to FIG. 4D indicate references to both FIGS. 4D-1 and 4D-2; references to FIG. 5B indicate references to both FIGS. 5B-1 and 5B-2; references to FIG. 5C indicate references to both FIGS. 5C-1 and 5C-2; and references to FIG. 5D indicate references to both FIGS. 5D-1 and 5D-2.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which generates evidence for the superiority of a distributed system configuration. Generating evidence about the superiority and optimality of a configuration of a distributed system can be part of an evidence generation framework or module, as one of four modules of a larger system described in U.S. patent application Ser. No. 16/219,774. This larger or overall system can be referred to as secure configurations for the IoT based on optimization and reasoning on graphs (or "SCIBORG"). The overall system can include the following four frameworks: (1) a data ingestion framework; (2) a modeling framework; (3) a reasoning framework; and (4) an evidence generation framework, as summarized below in relation to FIG. 1.

The overall system can model a composed system by constructing a multi-layer graph for a system with a plurality of components. The multi-layer graph can include: a dependency subgraph that captures the functional relationships among system components; a configuration subgraph that accounts for relationships among configuration parameters within and across components; and an attack or vulnerability subgraph modeling the vulnerabilities of the system and the user of those vulnerabilities in multi-step attacks. The modeling framework can take as input the data ingested and extracted by the data ingestion module. Extracted configuration information can be used to generate the configuration subgraph, extracted vulnerability information can be used to generate the vulnerability subgraph, and extracted dependency information can be used to generate the dependency subgraph. The modeling framework is described in U.S. patent application Ser. No. 16/918,971, and the data ingestion framework is described in U.S. patent application Ser. No. 16/918,966.

As described above, current solutions which work on minimizing the attack surface of a system do not capture the intricate relationships between configuration parameters, attack paths available to an adversary, and functional dependencies among system components. Thus, current solutions generally fail to reduce the risk associated with residual vulnerabilities. The overall system addresses these issues by characterizing the potential impact of multi-step attacks enabled by configuration settings.

The overall system also uses algorithms and software tools to jointly analyze the subgraphs of the multi-layer graph in order to reason about the impact of a candidate configuration set on the security and functionality of the composed system, e.g., via the reasoning framework, by using a Satisfiability Modulo Theory (SMT) solver to express the complex relationships among the configuration parameters as constraints in a security optimization problem. The reasoning framework is described in U.S. patent application Ser. No. 16/923,763.

The overall system can be implemented with a scalable pipeline, which can: ingest system requirements, configuration files, software documentation and various types of configuration vulnerabilities (data ingestion framework); based on the data ingested in the data ingestion framework, build a queryable, graph-based representation of the relationships between configuration vulnerabilities and attack scenarios, configuration parameters, and system components (modeling framework); provide an application programming interface (API) to perform a quantitative, comparative analysis of the security impact of configuration settings (reasoning framework); automatically construct a constraint satisfaction problem based on the model and utilize a Z3 SMT solver to solve for optimal parameter values (reasoning framework); and provide human-readable evidence about the optimality of the selected configuration (evidence generation framework).

The reasoning framework can obtain or take as input the multi-layer graph constructed by the modeling framework for a system with a plurality of components. The multi-layer graph can include a configuration subgraph, a vulnerability subgraph, and a dependency subgraph, including nodes in each of the three subgraphs as well as directed edges between nodes in a same graph or between nodes in different subgraphs. The reasoning framework can determine constraint relationships associated with configuration parameters for the components. These constraint relationships can include security constraints and functionality constraints, as described below. The reasoning framework can be implemented by using a solver, such as an SMT solver, to determine configurations which minimize the security impact to the overall system while satisfying configuration constraints and preserving the functionality of the overall system. The reasoning framework can also determine configurations which optimize or prioritize functionality constraints over security constraints, depending on a chosen "constraint relaxation strategy" (or "strategy"). This strategy can be one of three strategies, and can be chosen by a user or configured by the system based on an operational context of the overall system, as described below.

The reasoning framework, via the SMT solver, can compute an unsatisfiable core ("unsat core"), which can include mutually incompatible constraints. This computation can be based on solving a Constraint Satisfaction Problem (CSP). The reasoning framework can resolve the unsat core and attempt to solve the CSP based on the chosen strategy and over multiple iterations (or rounds), for a number of rounds until: the CSP is satisfied; the unsat core is empty and includes no remaining mutually incompatible constraints; the number of iterations exceeds a predetermined or configured number of rounds; or the SMT solver fails to produce an empty unsat core and a solution to the CSP.

Upon resolving the unsat core or terminating the iterations based on one of the above reasons, the reasoning framework can provide output to the evidence generation framework. Using this output, the evidence generation framework can generate evidence of a recommended configuration for the system. The output and generated evidence can include recommended configuration parameter values, which the evidence generation framework can display on a screen of a user device as, e.g., a table, with rows or entries which include: the name of the parameter; the current value (e.g., a list of current values or an array of elements which represent current values); and the recommended value. The recommended value can include one or more of the elements of the current value list or array. An exemplary table is described below in relation to FIGS. 4D and 4E.

The generated evidence can also include, for each iteration: a summary of the execution of the iteration; information related to a pair of mutually incompatible constraints of the unsat core (if available); and information relating to a constraint relaxation strategy performed in a previous iteration. The summary of the execution of the iteration can include: a number corresponding to the respective iteration or round; an indicator of whether all the constraints indicated in the multi-layer graph are satisfied; an indicator of whether the unsat core is empty; and an indicator of whether a pair of mutually incompatible constraints is being compared or analyzed in the respective iteration or round. The information related to the pair of mutually incompatible constraints can include: the name of the constraint; a goal or strategy associated with the constraint; a security impact of the constraint; and a description of the constraint. The information relating to the constraint relaxation strategy performed in the previous iteration can include the name of a constraint dropped from the pair of mutually incompatible constraints of the unsat-core in the previous iteration. Exemplary detailed information for each iteration or round is described below in relation to FIGS. 5A-5D.

The evidence generation framework can display the above described evidence on the screen of the user device as part of a graphical user interface which includes one or more interactive elements. An exemplary output on a display screen is described below in relation to FIGS. 4E, 4D, and 5A-5D. An exemplary output on the display screen corresponding to other system-related information, including information output by the modeling framework, is described below in relation to FIGS. 4A-4C.

The terms "framework" and "module" are used interchangeably in this disclosure, and refer to a component or unit of the "overall system" or "SCIBORG." A framework or module can be associated with various operations and functions, as described herein.

The term "overall system" refers to SCIBORG, which includes the four frameworks (i.e., data ingestion framework, modeling framework, reasoning framework, and evidence generation framework). The terms "evidence generation framework" and "evidence generation module" are used interchangeably in this disclosure, and refer to one of the four frameworks of the overall system or SCIBORG. The term "system" can refer to the overall system or the evidence generation module/framework. The term "computing system" refers to SCIBORG, the overall system, the system, or the evidence generation framework.

The terms "distributed system" or "composed system" (e.g., an IoT system) refers to a distributed system with a plurality of components, for which the overall system or SCIBORG (with its four frameworks) ingests data, generates a model, reasons about the optimality of configuration parameters based on security, functionality, or both, and generates evidence.

The terms "vulnerability graph" and "attack graph" are used interchangeably in this disclosure, and refer to one of the three subgraphs of the generated multi-layer graph.

The terms "graph" and "subgraph" are used interchangeably in this disclosure to describe the three graphs or subgraphs which make up the generated multi-layer graph of the described embodiments, i.e.: the configuration graph or subgraph; the vulnerability graph or subgraph; and the dependency graph or subgraph.

The terms "node" and "vertex" are used interchangeably in this disclosure, and refer to a point, unit, or object in a graph or subgraph.

The terms "strategy" and "policy" are used interchangeably in this disclosure, and refer to a feature which is configured by a user or set by the system.

The terms "iteration" and "round" are used interchangeably in this disclosure, and refer to an operation of the reasoning framework in comparing or analyzing a pair of mutually incompatible constraints. As described below in relation to FIGS. 5A-5D, the displayed output associated with comparing a pair of mutually constraints and dropping one of the pair of constraints may be depicted in separate "rounds" such that two "rounds" may be used to depict the resolution of a pair of mutually incompatible constraints.

The terms "unsatisfiable core" or "unsat core" are used interchangeably in this disclosure, and refer to the result of the solver after performing multiple iterations to resolve mutually incompatible constraints associated with configuration parameters of a target system, including functionality constraints and security constraints.

The term "solver" can refer to a mathematical solver, such as a Satisfiability Modulo Theory (SMT) solver or a Satisfiability (SAT) solver.

High-Level Overview of System with Four Frameworks/Modules

FIG. 1 illustrates an exemplary environment 100 for facilitating an improvement in the security versus functionality tradeoff of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108. Data ingestion framework 102 can determine information sources associated with software, hardware, middleware, and networking components of a system, and can further receive data from those information sources as input (e.g., input 110 which can include configuration files, functional requirements, documentation, and vulnerabilities information).

Modeling framework 104 can take as input information obtained, ingested, and extracted by data ingestion framework 102, and can produce as output three subgraphs which comprise the multi-layer graph described herein: an attack subgraph 122; a dependency subgraph 124; and a configuration subgraph 126. A detailed flow of the operations performed by modeling framework 104 is described below in relation to FIGS. 2B and 3. Reasoning framework 106 can use the constructed multi-layer graph output by modeling framework 104, and reasoning framework 106 can also receive an optional user input 112.

Evidence generation framework 108 can use as input the output of reasoning framework 106, and evidence generation framework 108 can produce as output an updated configuration and report 114. Updated configuration and report 114 can be displayed on a screen of a user device as part of a graphical user interface with interactive elements, and can take the form of a file or document with text, images, and interactive elements or links, e.g., a pdf, a word doc, a powerpoint, or other file. An example of data which can be included in updated configuration and report 114 is provided below in relation to FIGS. 4A-4E and 5A-5D.

Exemplary Multi-Layer Graph Constructed by the Modeling Framework

Figure 2A:
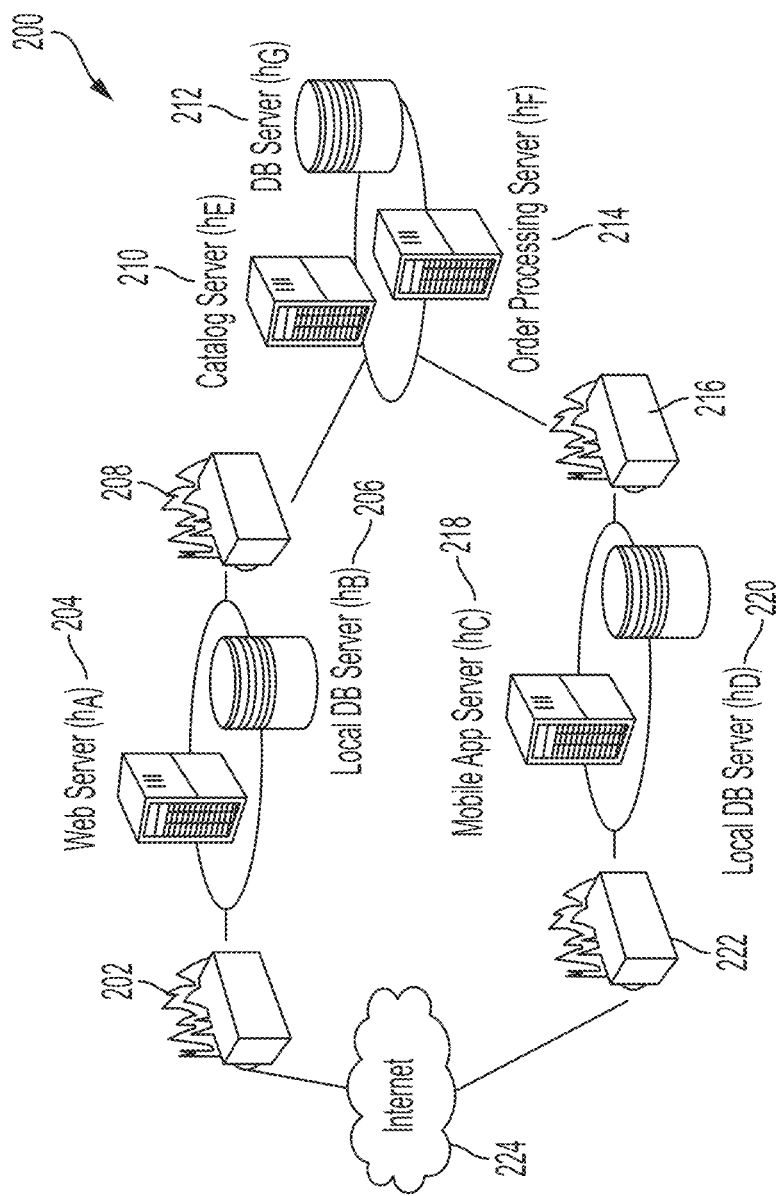
FIG. 2A illustrates an exemplary network diagram of an e-commerce system, in accordance with an embodiment of the present application.

FIG. 2A illustrates an exemplary network diagram 200 of an e-commerce system, in accordance with an embodiment of the present application. Diagram 200 can include clusters or groups of entities separated by firewalls and connected via a network 224 (e.g., the internet). For example, a first set of entities can include a Web Server 204 ($h_A$) and a Local Database Server 206 ($h_B$). The first set of entities can be separated by a firewall 208 from a second set of entities, which can include a Catalog Server 210 ($h_E$), a Database Server 212 ($h_G$), and an Order Processing Server 214 ($h_F$). The second set of entities can be separated by a firewall 216 from a third set of entities, which can include a Mobile Application Server 218 ($h_C$) and a Local Database Server 220 ($h_D$). The third set of entities can be separated by a firewall 222 from network or internet 224, and the first set of entities can be separated by a firewall 202 from network or internet 224. Entities in a same or different group may be dependent upon each other, as depicted below in relation to FIG. 2B.

Figures 1, 2B:
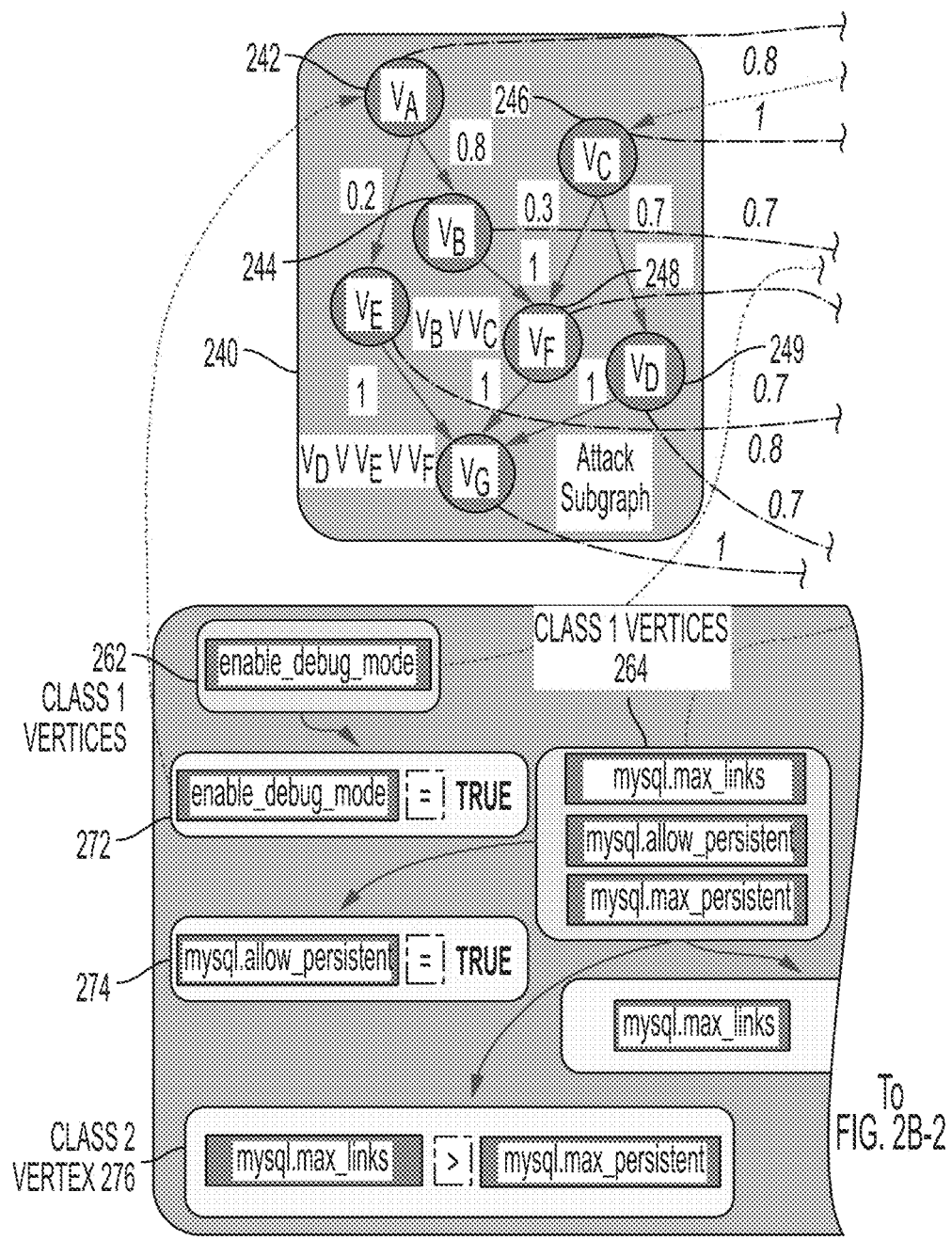
Figures 2, 2B:
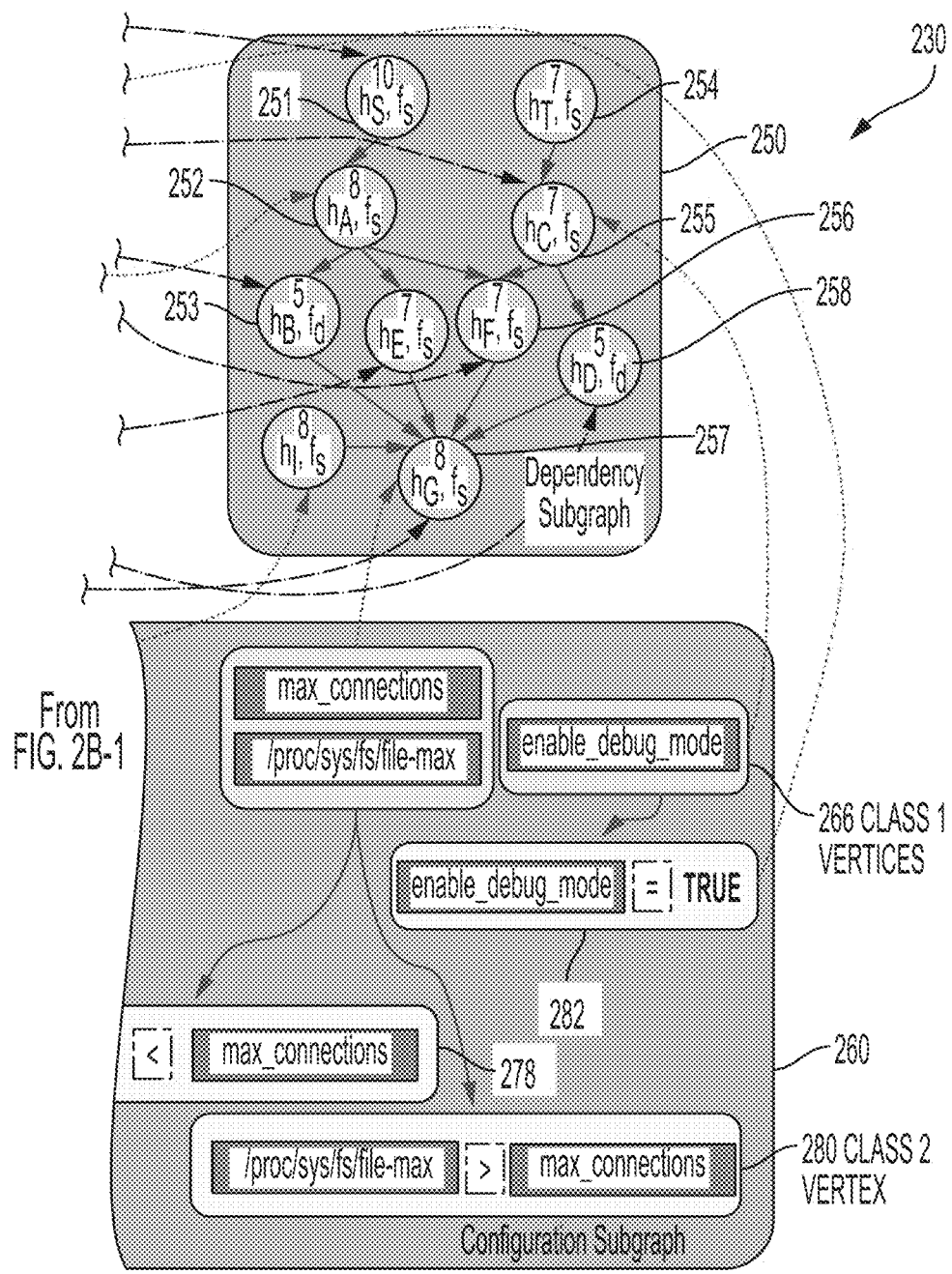

FIGS. 2B-1 and 2B-2 illustrate an exemplary multi-layer graph 230 corresponding to the network diagram of FIG. 2A, in accordance with an embodiment of the present application. Graph 230 can include an attack subgraph 240, a dependency subgraph 250, and a configuration subgraph 260.

As described above, modeling framework 104 of FIG. 1 can use the ingested data from data ingestion framework 102 to construct a three-layer directed graph that efficiently encodes the information needed for computing optimal configurations. A first layer can comprise a dependency subgraph, a second layer can comprise a configuration subgraph, and a third layer can comprise an attack subgraph. The edges between these three subgraphs can determine the functional composition and the attack surface for a configuration set, as described in detail below.

The dependency subgraph (subgraph 250) represents the functional dependencies between components of the target composed system. In this subgraph, each vertex represents a functional component of the system and carries a utility value. Each vertex also has a label identifying one of three dependency types, as described below. Each edge in the dependency subgraph represents a functional dependency on another component, as specified by the dependency label of the parent vertex.

The configuration subgraph (subgraph 260) represents relationships between configuration parameters, both within any system component and across different components of the composed system. There are two classes of vertices in the configuration subgraph: a first class of nodes or "Class 1" vertices capture per-component configuration parameters; and a second class of nodes or "Class 2" vertices capture relationships among (or conditions on) the configuration parameters. These relationships are specified by functional system requirements and admissibility of the configuration setting, as described below. Furthermore, some of the relationships between the configuration parameters enable or disable preconditions for system vulnerabilities, which can result in inducing a particular attack subgraph for that configuration.

For example, configuration subgraph 260 can include Class 1 vertices 262, 264, and 266, where each group of Class 1 vertices is depicted in its own pink-colored box and corresponds to configuration parameters for a specific component depicted in dependency subgraph 250. Furthermore, configuration subgraph 260 can include Class 2 vertices 272, 274, 276, 278, 280, and 282, where each respective Class 2 vertex is depicted in its own beige-colored box and corresponds to a configuration constraint between configuration parameters (whether between configuration parameters within a same component or across different components), such as the configuration parameters indicated by Class 1 vertices 262-266.

The attack subgraph (subgraph 240) represents the propagation of potential multi-step attacks on components in the dependency graph for a particular configuration. In the attack subgraph, each vertex represents a vulnerability. An edge in the attack subgraph indicates that exploiting the parent vulnerability (a node at the start of a first green-colored arrow) can set the stage for the attacker to exploit the child vulnerability (a node at the end of the first green-colored arrow). Each edge is also labeled with a probability value, representing the probability of the attack progressing along that edge. The nodes and edges in attack subgraph 240 are described below.

In addition to the edges within subgraphs, the overall system and the constructed multi-layer graph can include edges across the three subgraphs, e.g., edges between nodes in different subgraphs or directed edges from a node in one subgraph to a node in another subgraph. That is, in the constructed multi-layer model, the three subgraphs can be connected to each other with three types of edges:

(1) Edges from the dependency subgraph to the configuration subgraph: An edge between a component in the dependency subgraph and a Class 1 vertex in the configuration subgraph represents the list of configuration parameters associated with that component. There are no edges between the dependency subgraph and Class 2 vertices in the configuration subgraph.

(2) Edges from the configuration subgraph to the vulnerability subgraph: An edge between a Class 2 node in the configuration subgraph and a vertex in the attack subgraph (i.e., a vulnerability) implies that the relationship expressed in the Class 2 vertex satisfies a precondition for that vulnerability.

(3) Edges from the vulnerability subgraph to the dependency subgraph: An edge between a vertex in the attack subgraph (i.e., a vulnerability) and a vertex in the dependency subgraph (i.e., a system component) represents the amount of degradation (i.e., exposure factor) of the component due to exploitation of the vulnerability and ranges from 0 to 1. As an example, multi-layer graph 230 of FIG. 2B indicates that the debug mode must be set to false for both $h_A$ and $h_C$.

Thus, the modeling framework can store relationships between system components, configuration parameters, configuration predicates, and vulnerabilities in a queryable, graph-based form. The modeling framework can also provide an application programming interface (API) to quantitatively evaluate the security of different system configurations using topological vulnerability analysis (e.g., by assessing and calculating the impact of one or more attack paths). The modeling framework can be built using a graph database platform, such as Neo4j, and the modeling framework can convert all ingested information into a graphical format. The modeling framework APIs which provide security evaluation and configuration impact analysis may be implemented as a Neo4j plug-in, which can: analyze attack scenarios (i.e., finite sequences of vulnerabilities that can be exploited by an attacker); (ii) compute various attack surface metrics; and (iii) assess the security impact of configuration changes, as described below.

Exemplary Graphical Display of a Multi-Layer Graph

Figure 3:
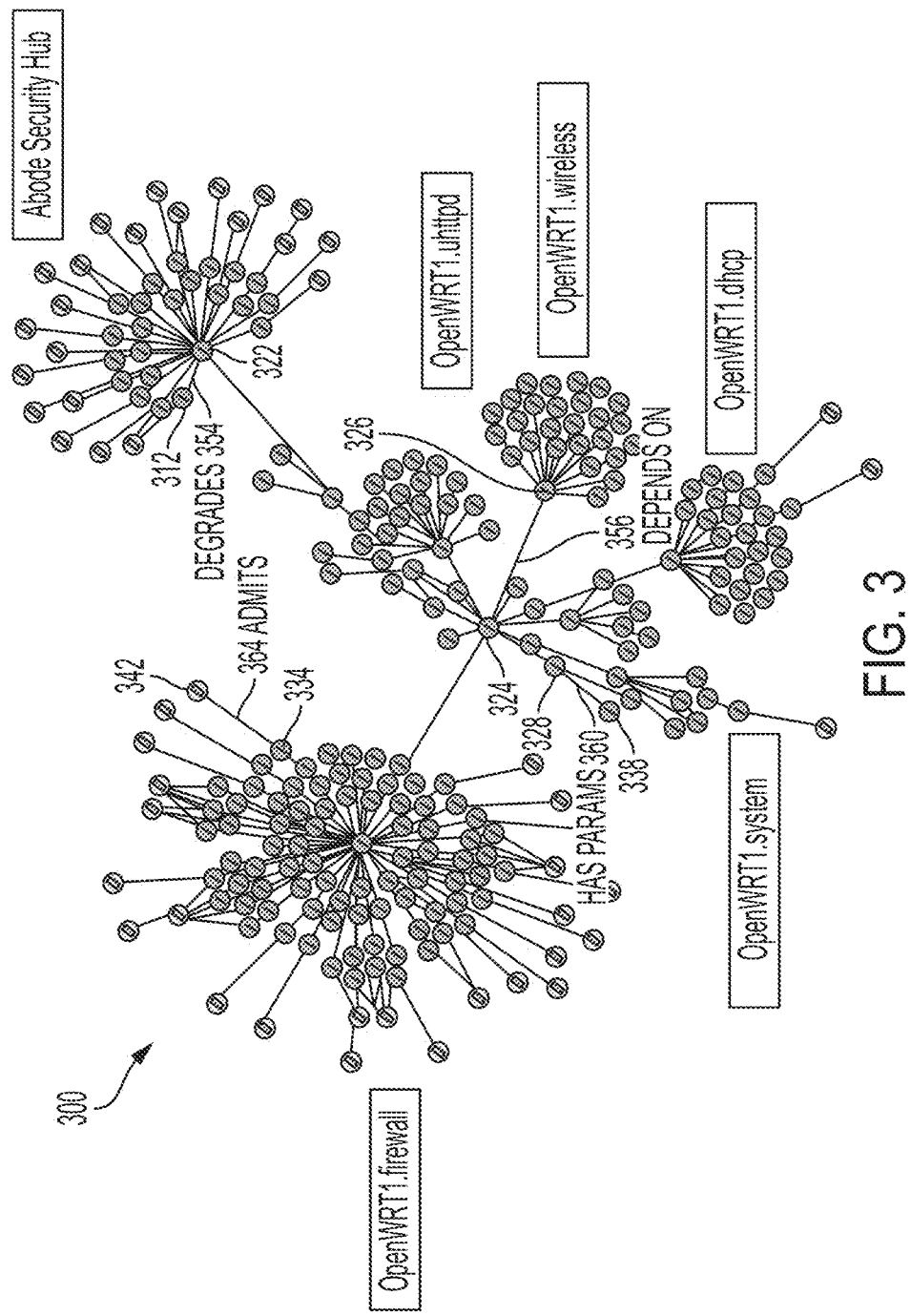
FIG. 3 illustrates an exemplary graphical display of a multi-layer graph, in accordance with an embodiment of the present application.

FIG. 3 illustrates an exemplary graphical display 300 of a multi-layer graph, in accordance with an embodiment of the present application. Graphical display 300 can include part of a multi-layer graph corresponding to sample testbed data. In graphical display 300, the red circles correspond to nodes in the vulnerability subgraph, the blue circles corresponds to nodes in the dependency subgraph, the green circles correspond to a first class of nodes (configuration parameters) in the configuration subgraph, and the yellow circles correspond to a second class of nodes (configuration constraints) in the configuration subgraph.

A directed edge from a red vulnerability subgraph node to a blue dependency subgraph node indicates that the vulnerability subgraph node degrades or causes a degradation of the dependency subgraph node. For example, vulnerability subgraph node 312 degrades (354) or represents the exposure factor of the component indicated by dependency subgraph node 322 based on the exploitation of vulnerability 312. A directed edge from a first dependency subgraph node to a second dependency subgraph node indicates that the first dependency subgraph node depends on the second dependency subgraph node. For example, dependency subgraph node 324 depends on (356) dependency subgraph node 326.

A directed edge from a dependency subgraph node to a configuration subgraph node of the first class (i.e., a configuration parameter) indicates that the dependency subgraph node is associated with or has parameters indicated by the configuration subgraph node of the first class. For example, dependency subgraph node 328 is associated with or has parameters (360) indicated in node 338. Furthermore, a directed edge from a Class 1 configuration subgraph node (i.e., a configuration parameter) to Class 2 configuration subgraph node (i.e., a configuration constraint) indicates that the Class 1 node identifies or admits the configuration parameters involved in the configuration constraint. For example, Class 1 configuration subgraph node 334 identifies or admits (364) the relationship of the configuration parameters involved in Class 2 configuration subgraph node 342.

Note that in exemplary graphical display 400 of FIG. 4, the use of the same numbers to identify nodes in the three subgraphs as well as directed edges within and between nodes in the three subgraphs is provided to demonstrate each node, pair of nodes, or relationship between nodes as directed edges. The exemplary nodes and relationships described in relation to the partial multi-layer graph of FIG. 3 are intended to provide a larger view of a displayed multi-layer graph. The text associated with each colored node and directed edge need not be clearly visible for purposes of illustrating the displayed multi-layer graph.

Thus, nodes in the configuration subgraph can encode information associated with a configuration parameter for a respective component ("Class 1 node") and can also encode relationships between configuration parameters, including: relationships among configuration parameters within components; and relationships among configuration parameters across components ("Class 2 node").

Nodes in the vulnerability subgraph can encode: known vulnerabilities associated with a component; bad security practices; and a negation of best security practices (i.e., "not-best security practices"). A directed edge from a first vulnerability subgraph node to a second vulnerability subgraph node can indicate that exploiting the first vulnerability subgraph node creates the preconditions for exploiting the second vulnerability subgraph node.

Nodes in the dependency subgraph can represent a respective component of the system and be labeled with a dependency type and a number representing a value associated with the respective component. A directed edge between a first dependency subgraph node and a second dependency subgraph node can indicate a dependency between two respective components, e.g., that a first dependency subgraph node depends on a second dependency subgraph node.

Furthermore, an edge between a component in the dependency subgraph and a Class 1 node in the configuration subgraph represents the list of configuration parameters associated with that component. An edge between a Class 2 node in the configuration subgraph and a vertex in the vulnerability subgraph (i.e., a vulnerability) implies that the relationship expressed in the Class 2 vertex satisfies a precondition for that vulnerability. An edge between a vertex in the attack subgraph (i.e., a vulnerability) and a vertex in the dependency subgraph (i.e., a system component) represents the amount of degradation (i.e., exposure factor) of the component due to exploitation of the vulnerability and ranges from 0 to 1.

High-Level Summary of Reasoning Framework

The reasoning framework aims to find configurations that minimize security impact while satisfying configuration constraints and preserving the functionality of the distributed system. In the overall system, the reasoning framework can compute these secure configurations based on satisfying configuration subgraph constraints, satisfying dependency subgraph constraints, and minimizing the security impact of all paths. The reasoning framework is described in U.S. patent application Ser. No. 16/923,763. As a summary, the reasoning framework can denote the $i^{th}$ configuration parameter as $f_i$ and the entire configuration by $F=(f_1, f_2, \ldots, f_k)$. At a high level, this constraint satisfaction problem (CSP) can be solved based on the following:

Find configuration $F=(f_1, f_2, \ldots, f_k)$ such that:
1) Configuration subgraph constraints are satisfied;
2) Dependency subgraph constraints are satisfied;
3)

$$F^* = \underset{F}{\text{argmin}} \sum_{P \in A(F)} \text{impact}(P) \quad \text{Equation (1)}$$

where $P=(v_i, v_2, \ldots v_n)$ is any path in the vulnerability subgraph A (F)=induced by the configuration F.

The reasoning framework can obtain F* using a solver, such as a Satisfiability Modulo Theory (SMT) solver or a Satisfiability (SAT) solver. Dependency subgraph constraints and configuration subgraph constraints can be derived from the modeling framework, and subsequently provided as inputs to the solver, as described below. The solver can also take as input the initial system configuration F, which can be assumed to correspond to parameter settings that place the system in a working state (although the initial system configuration F may not be optimal with respect to security or functionality). The goal of the reasoning framework (via the solver) is to find a configuration that improves the security and/or functionality.

While solving the CSP, the reasoning framework may encounter combinations of constraints that cannot be simultaneously satisfied (i.e., are "mutually incompatible"). Some of the constraints therefore must be carefully relaxed. The reasoning framework can perform this relaxation step-by-step based on to a predefined strategy that balances/prioritizes: security over functionality; functionality over security; or neither.

The overall system can use both the positive expression of certain vulnerabilities and the negation of predicates corresponding to certain vulnerabilities depending on which framework is involved. For the data ingestion framework, the system can identify both the functionality and security constraints. Either a positive expression (e.g., of a functionality constraint) or a negation of predicates corresponding to a certain vulnerability (e.g., "not-best security practices") can provide the system with the information needed to execute the data ingestion framework and the modeling framework. The reasoning framework may use either the positive or the negative expression, depending on the functionality constraint or security constraints.

The reasoning framework can input the formulated CSP problem into an SMT solver (such as Microsoft Z3) to obtain a solution with values for each parameter.

The reasoning framework can be configured to use one of three predefined strategies in the reasoning process: (1) Prioritize Functionality; (2) Prioritize Security; and (3) No Priority. These three strategies differ in the way that constraint relaxation occurs in the event of unsatisfiability of a CSP formulated in a previous reasoning round (i.e., in the event of a non-empty unsat core). If the employed strategy (or mode) is "Prioritize Functionality," the reasoning framework can form a new CSP by first removing constraints of type CurrentConfig that appear in the unsat core of the previous CSP. If the problem is still not satisfiable, the reasoning framework can remove constraints of type Security with the smallest security impact.

If the employed strategy (or mode) is "Prioritize Security," the reasoning framework can form a new CSP by first removing constraints of type CurrentConfig that appear in the unsat core of the previous CSP. If the problem is still not satisfiable, the reasoning framework can remove Functional constraints. Note that the recommended configuration found under this mode may violate functional requirements and therefore should not be used for deployment. However, it may be useful in analysis and to further understand the system requirements and their trade-offs with security.

If the employed strategy (or mode) is "No Priority," the reasoning framework can remove constraints of type CurrentConfig that appear in the unsat core of the previous CSP. If the problem is still unsatisfiable, the reasoning frame can report the unsat core and exit.

The system (or a user) may select or use a particular strategy based on an operational context of the overall system. For example, if the overall system is a ship in an operational context of "at sea," the system may determine to select or use the strategy which prioritizes functionality over security, because it may be deemed to be more essential to have a working system with properly functioning component over protecting the security of those components. On the other hand, if the ship is an operational context of "dry dock" or "not at sea" or "not active," the system may determine to select or use the strategy which prioritizes security over functionality, because protecting the security of the system while the system is in dry dock or non-operational may be deemed to be more essential than ensuring the functionality or operation of the system.

The reasoning framework can compute the unsat core, and can resolve, based on a strategy and over multiple iterations, the unsat core by analyzing one pair of mutually incompatible constraints (in the set of mutually incompatible constraints) per respective iteration, as described in U.S. patent application Ser. No. 16/923,763. The reasoning framework can provide its output to the evidence generation framework. The evidence generation framework can display the output on the screen of a user device, in a graphical user interface with one or more interactive elements. The output can include the information described below in relation to FIGS. 4A-4E and 5A-5C.

Detailed Overview of Evidence Generation Framework

The evidence generation framework can provide graph-based visualizations and human-readable text describing the optimality of the computed configuration. The evidence generation framework can collect reasoning artifacts, including unsatisfiable cores associated with each reasoning rounds, dropped Z3 clauses and their impact on the attack surface metric, descriptions of vulnerabilities either addressed or outstanding. The evidence generation framework can render these reasoning artifacts and other evidence in different formats (e.g., pdf), as described below in relation to FIGS. 4A, 4C-4E, and 5A-5D.

Configurable System Options; Constraint Relaxation Strategy; and Multi-Layer Graph Information FIG. 4A illustrates an exemplary display 400 on a user device, including configurable options for system settings, in accordance with an embodiment of the present application. Display 400 can include a table, with columns including a system option 402 and a corresponding value 404. For example, an entry 406 for a maximum number reasoning rounds 408 can correspond to a value of "10." An entry 410 for a modeling framework FQDN 412 can correspond to a value of "helsinki.local." An entry 414 for a modeling framework username 416 can correspond to a value of "neo4j." An entry 418 for a constraint relaxation strategy 420 can correspond to a value of "1" (which values are defined below in relation to FIG. 4B). An entry 422 for a system output directory 424 can correspond to a value of "/sciborg-output." An entry 426 for a system reporting directory 428 can correspond to a value of "/sciborg-output/ report." An entry 430 for a solver output directory 432 can correspond to a value of "/sciborg-output/solver."

Display 400 can include one or more interactive elements which allow the user to change the configuration of the options for the system settings and run the reasoner again based on the changed configurations. For example, the user may click or hover a mouse or other pointing device on or over (or hold, touch, or press an area of the display screen corresponding to) a given entry to change value 404 for the given entry. Alternatively, the interactive elements may allow the user to directly input the new configuration value in the table of display 400. Display 400 may also include a widget, button, graphical user interface element, or other interactive element, which allows the user to press or activate a "Return" or "Go" command (not depicted). The activation of this command may initiate a running of the overall system based on any changed configurations in display 400.

For example, if system relates to a ship, assume that the operational context of the system for the original configuration of the ship was "active" or "at sea" (hence the prioritization of functionality, where constraint relaxation strategy 420 is set to value of "1"). If the user determines a change in the operational context to "dry dock" or "inactive" or "debug mode," the user may decide to change the value for entry 418 of constraint relaxation strategy 420 from a value of "1" (which prioritizes functionality) to a value of "2" (which prioritizes security). The values for constraint relaxation strategy 420 are described below in relation to FIG. 4B, and an example of a user updating a value and sending a command to generate updated evidence is described below in relation to FIGS. 7A and 7B.

FIG. 4B illustrates an exemplary index 440 for possible values for constraint relaxation strategy 420 of FIG. 4A, in accordance with an embodiment of the present application. Index 440 can indicate a constraint relaxation strategy (CRS) identification (ID)/value 442 and a corresponding constraint relaxation strategy 444. Entry 446 can indicate a CRS ID/value of "ID 0" which corresponds to "improve current configuration without using constraint prioritization." Entry 448 can indicate a CRS ID/value of "ID 1" which corresponds to "improve current configuration, prioritize functionality." Entry 450 can indicate a CRS ID/value of "ID 2" which corresponds to "improve current configuration, prioritize security."

FIG. 4C illustrates an exemplary table 458 listing information corresponding to the multi-layer model on which the reasoning framework and the evidence generation are based, in accordance with an embodiment of the present application. The evidence generation framework can display table 458 on the display screen of the user as part of, e.g., displayed multi-layer model 300 of FIG. 3. Entry 468 in table 458 can indicate: a number of components 460 with a value of "23"; a number of parameters 462 with a value of "221"; a number of constraints 464 with a value of "53"; and a number of vulnerabilities 466 with a value of "9." Note that entry 468 may not correspond exactly to model 300, and is provided for exemplary purposes.

List of Configuration Parameters, Current Values, and Suggested Values

FIGS. 4D-1 and 4D-2 illustrate an exemplary list 470 of configuration parameters, including a name, a current value, and a suggested value for a respective configuration parameter, in accordance with an embodiment of the present application. List 470 can include entries which indicate: a parameter name 472; a current value 474, which can be a first array with current or possible values for the respective configuration parameter used by the distributed system; and a suggested value 476, which can be a second array with recommended values for the respective configuration parameter suggested by the system. The size of the second array can be smaller than the size of the first array. The elements in an array can include, e.g., Boolean values, integers, strings, etc.

For example, each of entries 478, 480, 482, 484, 486, 488, and 489 include: a name for the respective configuration parameter; an array of current values for the respective configuration parameter; and a suggested or recommended value for the respective configuration parameter. While suggested value 476 only depicts one value, the system may suggest a plurality of values, e.g., in the second array of suggested value 476. The second array of suggested value 476 can include a fewer number of elements than the number of elements in the first array of current value 474.

FIG. 4E illustrates an exemplary list 490 of configuration parameters, including a name, a current value, and a suggested value for a respective configuration parameter, in accordance with an embodiment of the present application. List 490 can includes entries 492, 494, 496, and 498, and can be a continuation of list 470, and can include entries which indicate similar information: a parameter name 472; a current value 474; and a suggested value 476.

The system can display, on the screen of a user device, an interactive element which allows the user to view a resolution of a pair of mutually incompatible constraints resulting in the suggested value for a respective configuration parameter. For example, in entry 496, the user can click on a "View More Info . . . " 497 widget, which results in displaying information associated with a round or iteration in which the system resolves a pair of mutually incompatible constraints, e.g., as described below in relation to Round 2 of FIG. 5B.

While widget 497 is depicted as a clickable button, the interactive element may be indicated as a link on or near the entry for a respective configuration parameter, or may appear when the user touches and holds a link or widget or other area of the display screen associated with the respective entry, or may appear when the user hovers a mouse or other pointing device over or near the area of the display screen associated with the respective entry. The area may be defined based on a first predetermined distance from the text or row of the entry, and the proximity (i.e., nearness) may be defined based on a second predetermined distance from the defined area. The interactive element may allow the user to select one or more entries or configuration parameters (e.g., by clicking on or checking a selection or radio button) and subsequently sending a command via another widget (not shown) or other interactive element to display the selected one or more entries or configuration parameters.

Detailed Round Information

FIGS. 5A-5D depict an exemplary display for information in each round or iteration performed by the reasoning framework and presented by the evidence generation framework. FIGS. 5A-5D depict a total of seven rounds. Note that the first round can represent an initialization round, and that the system uses two "rounds" as depicted to execute both the operations of comparing/analyzing a pair of mutually incompatible constraints (e.g., as depicted in the even-numbered rounds) and resolving the pair of mutually incompatible constraints (as depicted in the odd-numbered rounds, with the exception of the first initialization round).

FIG. 5A depicts an exemplary display 500 for information in each round or iteration presented by the evidence generation framework, in accordance with an embodiment of the present application. Display 500 can include an execution summary for each round, which can include: a round number 502; an indicator of whether all constraints are mutually satisfied 504; an indicator of whether the system has a model and an indicator of whether the unsat core is empty 506; and an indicator of whether the system is currently comparing (or analyzing) a pair of mutually incompatible constraints of the unsat core 508.

Each round can also include (if available) unsat core information (e.g., 522), which can include: a constraint name 510; a constraint goal 512; a constraint security impact; and a constraint 516. Each round can further include relaxed constraint information (e.g., 526), which can include: a name of the constraint dropped (from the prior round's unsat core) 518; and a reason or rationale for dropping the constraint 520.

For example, in round 1, display 500 indicates that the constraints are not mutually satisfied ("FALSE"), the system does not have a model and the unsat core is not empty ("FALSE"), and the system is not currently comparing a pair of mutually incompatible constraints ("FALSE"). Unsat core information 522 has no information (indicated as "not available" or "N/A" in an entry 524), and relaxed constraint information 526 also has no information (indicated as "not available" or "N/A" in an entry 528).

Figures 1, 5B:
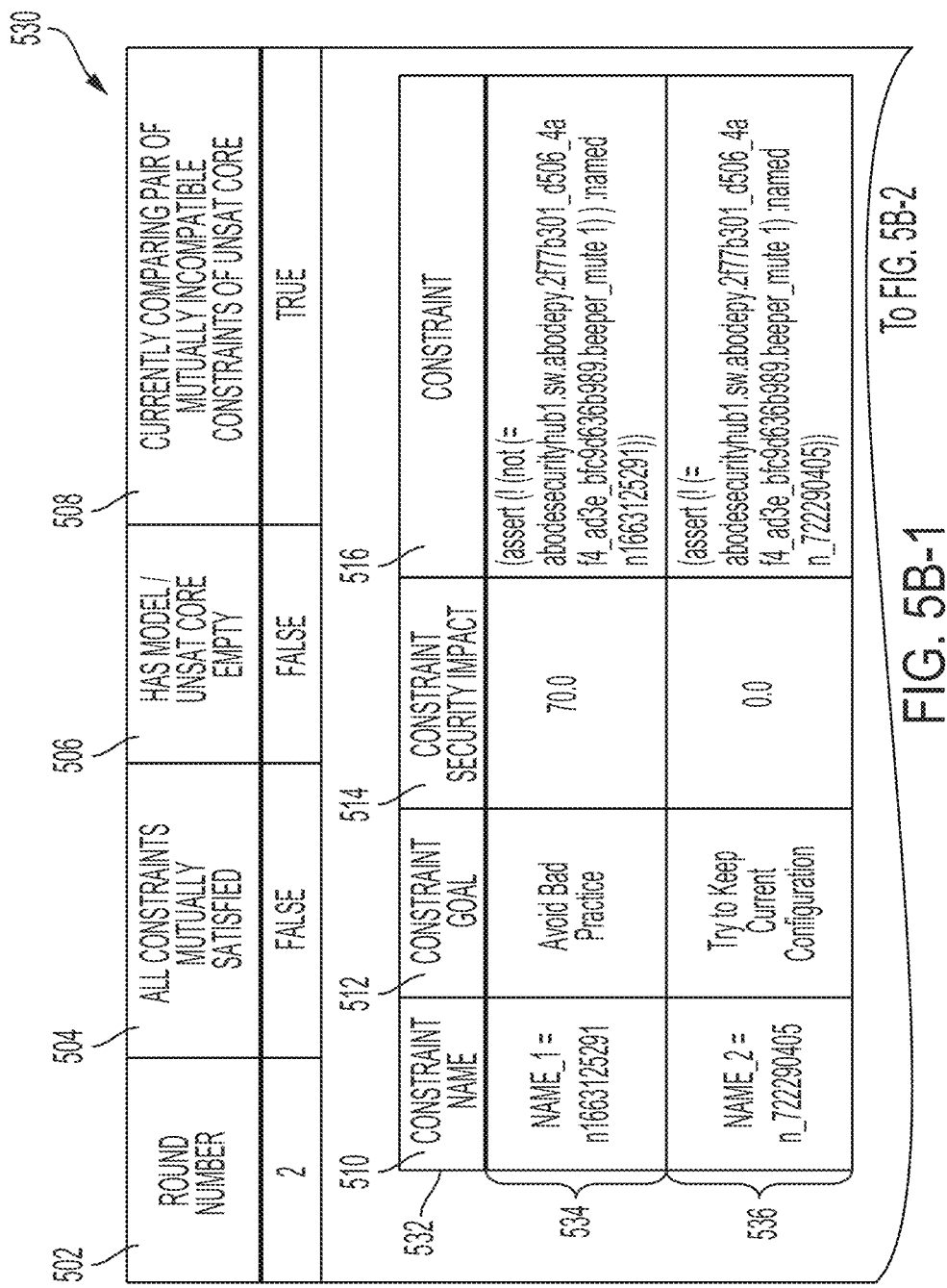
Figures 2, 5B:
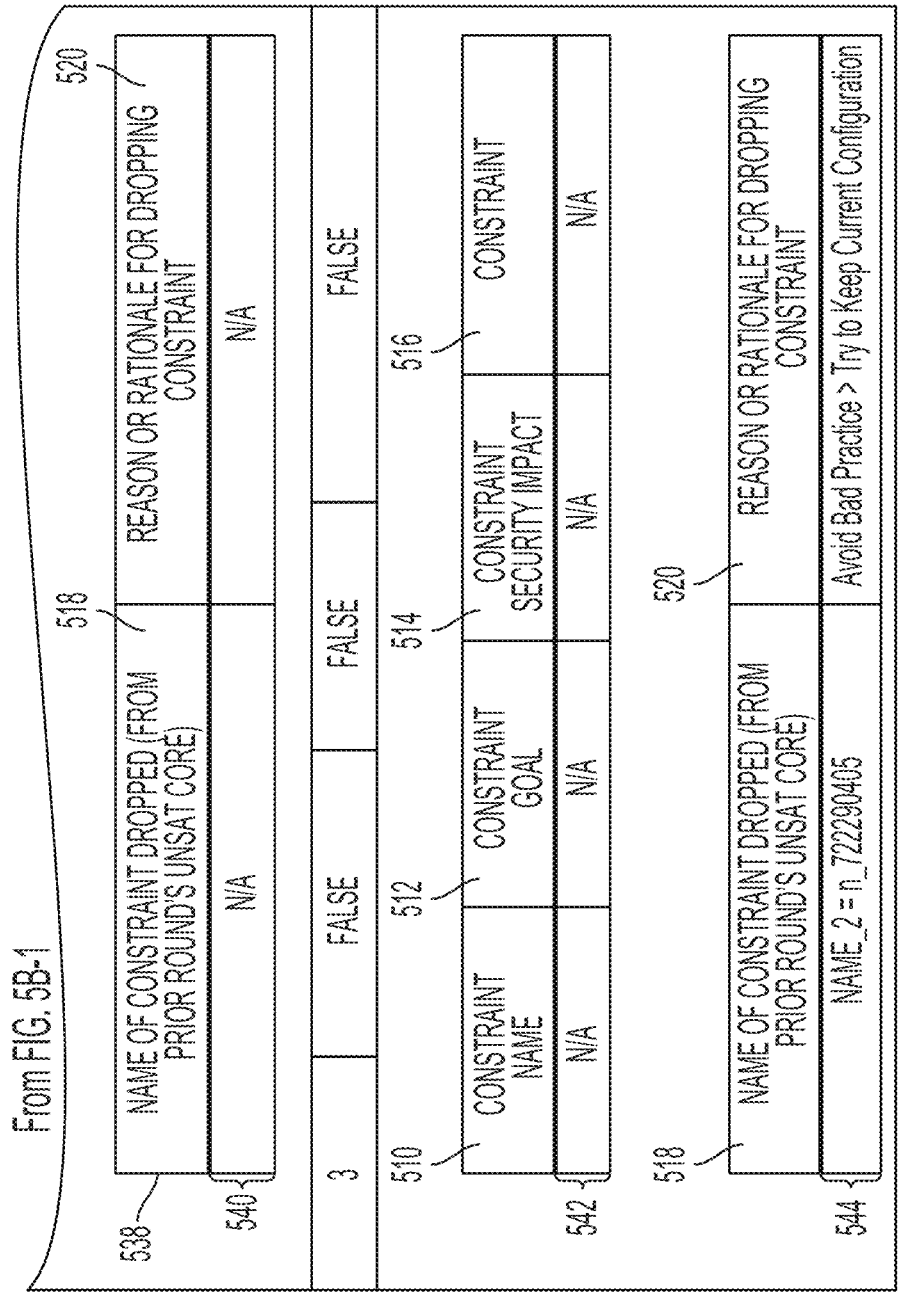

FIGS. 5B-1 and 5B-2 depict an exemplary display 530 for information in each round or iteration presented by the evidence generation framework, in accordance with an embodiment of the present application. Similar to display 500 of FIG. 5A, display 530 can include an execution summary for each round, which can include: a round number 502; an indicator of whether all constraints are mutually satisfied 504; an indicator of whether the system has a model and an indicator of whether the unsat core is empty 506; and an indicator of whether the system is currently comparing (or analyzing) a pair of mutually incompatible constraints of the unsat core 508. Each round can also include unsat core information (e.g., 532) and relaxed constraint information (e.g., 538).

For example, in round 2, display 530 indicates that the constraints are not mutually satisfied ("FALSE"), the system does not have a model and the unsat core is not empty ("FALSE"), and the system is currently comparing a pair of mutually incompatible constraints ("TRUE"). Unsat core information 532 can include information for the pair of mutually incompatible constraints which are compared or analyzed by the system in this round. Note that each pair of mutually incompatible constraints in a round can include a first constraint and a second constraint. An entry 534 corresponds to a first constraint related to a beeper mute, with the following information: a constraint name of "NAME_1=n1663125291"; a constraint goal of "Avoid Bad Practice"; a constraint security impact of "70.0"; and a constraint stated as "(assert (! (not (=abodesecurityhub1. sw.abodepy. 2f77b301_d506_4af4_ad3e_bfc9d636b989. beeper_mute 1)):named n1663125291))." An entry 536 corresponds to a second constraint related to the beeper mute, with the following information: a constraint name of "NAME_2=n_722290405"; a constraint goal of "Try to Keep Current Configuration"; a constraint security impact of "0.0"; and a constraint stated as (assert (! (=abodesecurityhub1. sw.abodepy.2f77b301_d506_4af4_ad3e_ bfc9d636b989.beeper_mute 1):named n_722290405))."

Relaxed constraint information 538 can include an entry 540 with no information (indicated as "N/A").

In round 3, display 530 indicates that the constraints are not mutually satisfied ("FALSE"), the system does not have a model and the unsat core is not empty ("FALSE"), and the system is not currently comparing a pair of mutually incompatible constraints ("FALSE"). Unsat core information can include an entry 542 with no information (indicated as "N/A"). Relaxed constraint information can include an entry 544 which includes: a name of the constraint dropped (from the prior round's unsat core) of "NAME_2=n_722290405"; and a reason or rationale for dropping the constraint which indicates that the system prioritizes "Avoid Bad Practice" over (i.e., ">") "Try to Keep Current Configuration."

Figures 1, 5C:
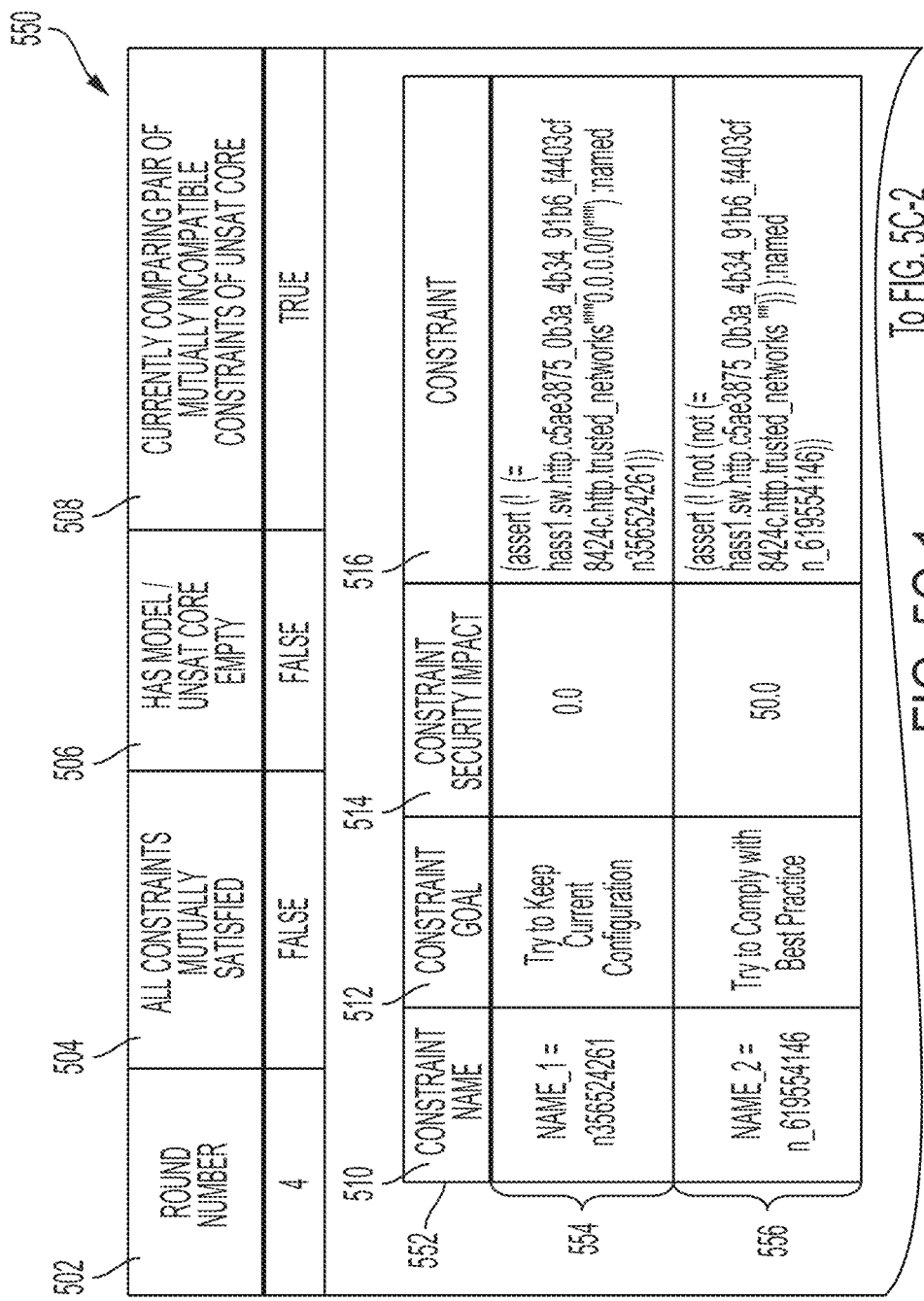
Figures 2, 5C:
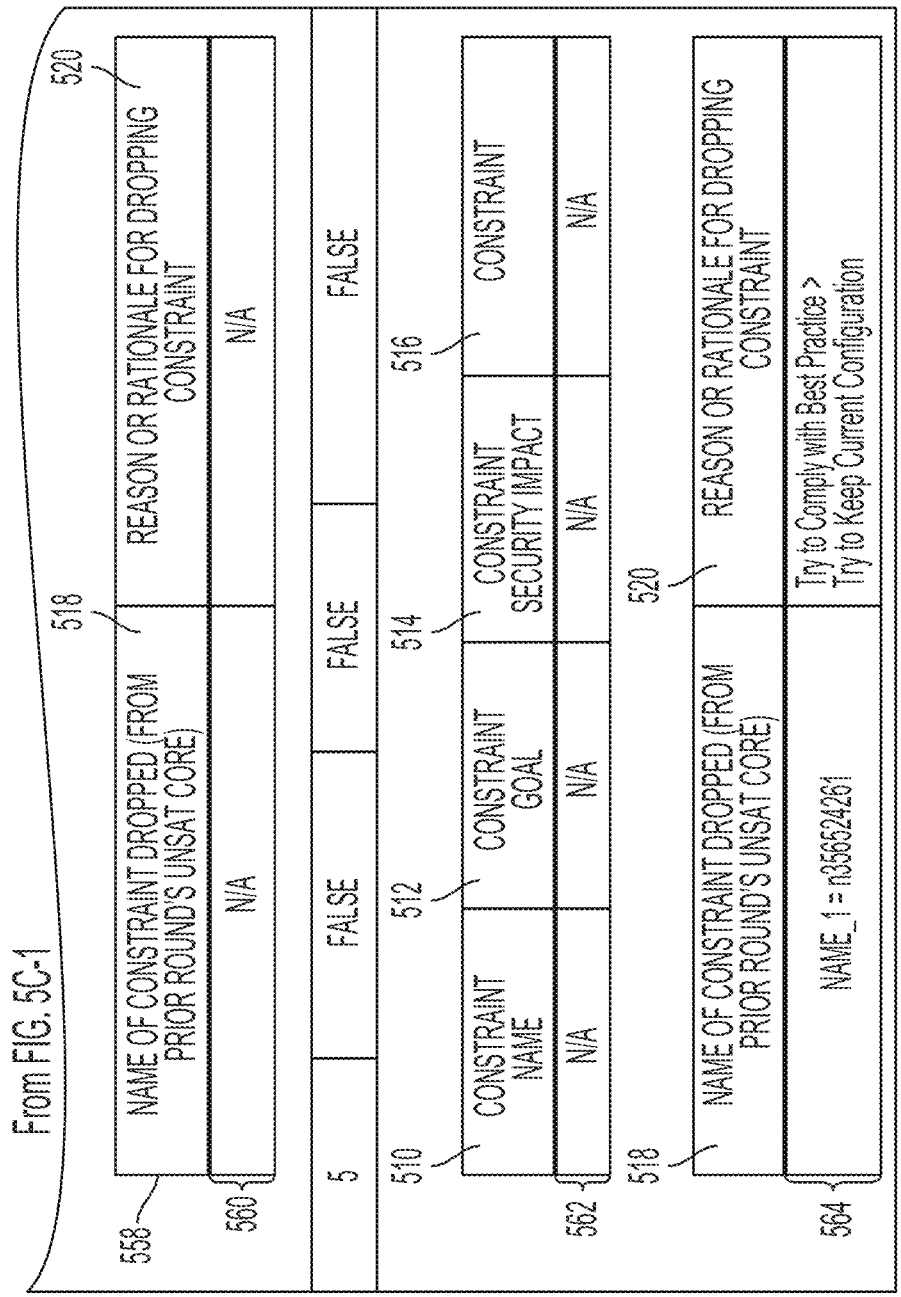

FIGS. 5C-1 and 5C-2 depict an exemplary display 550 for information in each round or iteration presented by the evidence generation framework, in accordance with an embodiment of the present application. Display 550 illustrates information from rounds subsequent to the rounds displayed in display 530. For example, in round 4, display 550 indicates that the constraints are not mutually satisfied ("FALSE"), the system does not have a model and the unsat core is not empty ("FALSE"), and the system is currently comparing a pair of mutually incompatible constraints ("TRUE"). Unsat core information 552 can include information for the pair of mutually incompatible constraints which are compared or analyzed by the system in this round (e.g., as indicated by "NAME_1" and "NAME_2"). An entry 554 corresponds to a first constraint related to a trusted network, with the following information: a constraint name of "NAME_1=n356524261"; a constraint goal of "Try to Keep Current Configuration"; a constraint security impact of "0.0"; and a constraint stated as "(assert (! (=hass1.sw.http. c5ae3875_0b3a_4b34_91b6_f4403cf8424c. http.trusted_ networks""""0.0.0.0/0""""):named n356524261))." An entry 556 corresponds to a second constraint related to the trusted network, with the following information: a constraint name of "NAME_2=n_619554146"; a constraint goal of "Try to Comply with Best Practice"; a constraint security impact of "50.0"; and a constraint stated as "(assert (! (not (not (=hass1.sw.http.c5ae3875_0b3a_4b34_91b6_f4403cf8424c. http.trusted_networks"""")))):named n_619554146))."

Relaxed constraint information 558 can include an entry 560 with no information (indicated as "N/A").

In round 5, display 550 indicates that the constraints are not mutually satisfied ("FALSE"), the system does not have a model and the unsat core is not empty ("FALSE"), and the system is not currently comparing a pair of mutually incompatible constraints ("FALSE"). Unsat core information can include an entry 562 with no information (indicated as "N/A"). Relaxed constraint information can include an entry 564 which includes: a name of the constraint dropped (from the prior round's unsat core) of "NAME_1=n356524261"; and a reason or rationale for dropping the constraint which indicates that the system prioritizes "Try to Comply with Best Practice" over (i.e., ">") "Try to Keep Current Configuration."

Figures 1, 5D:
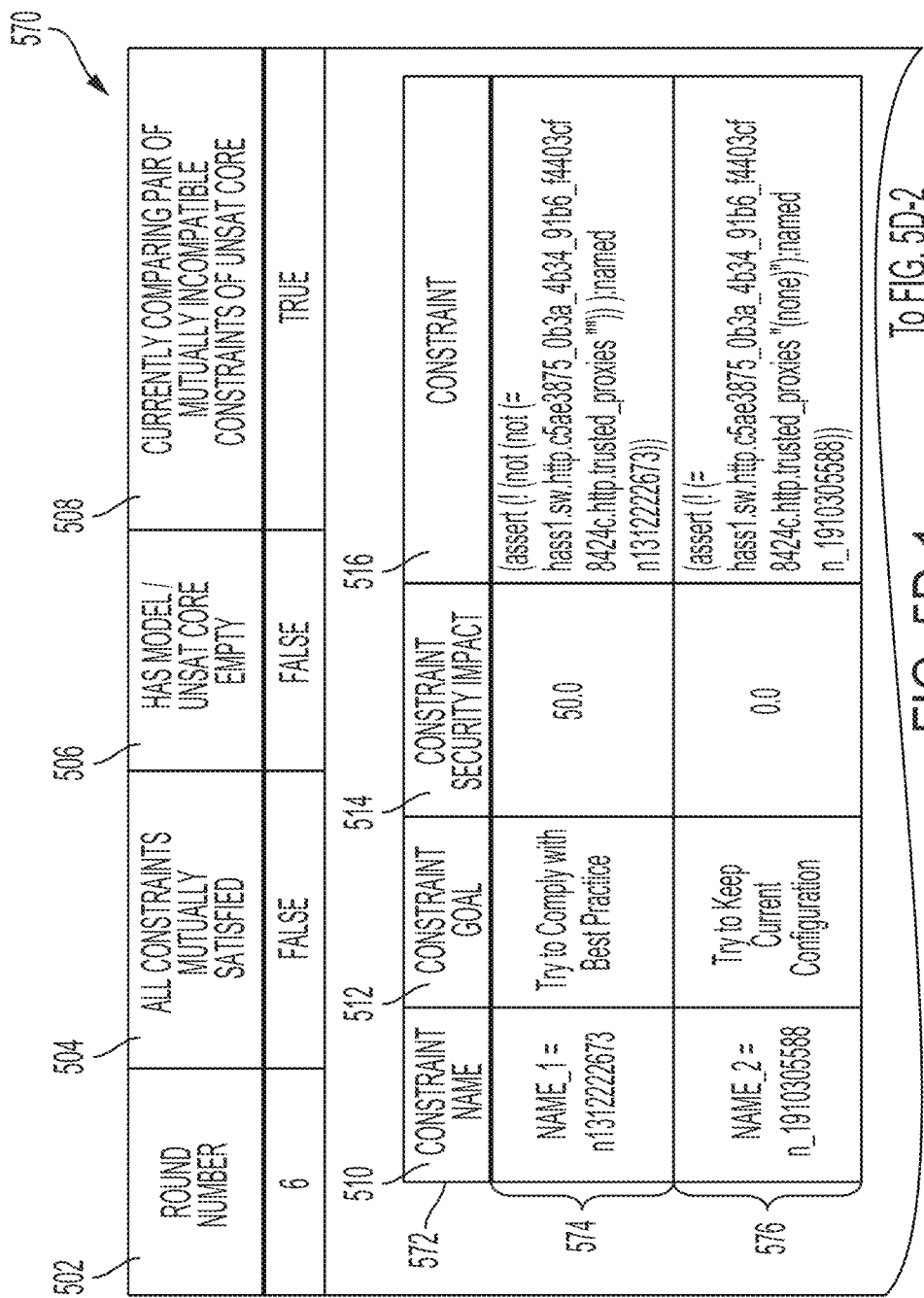
Figures 2, 5D:
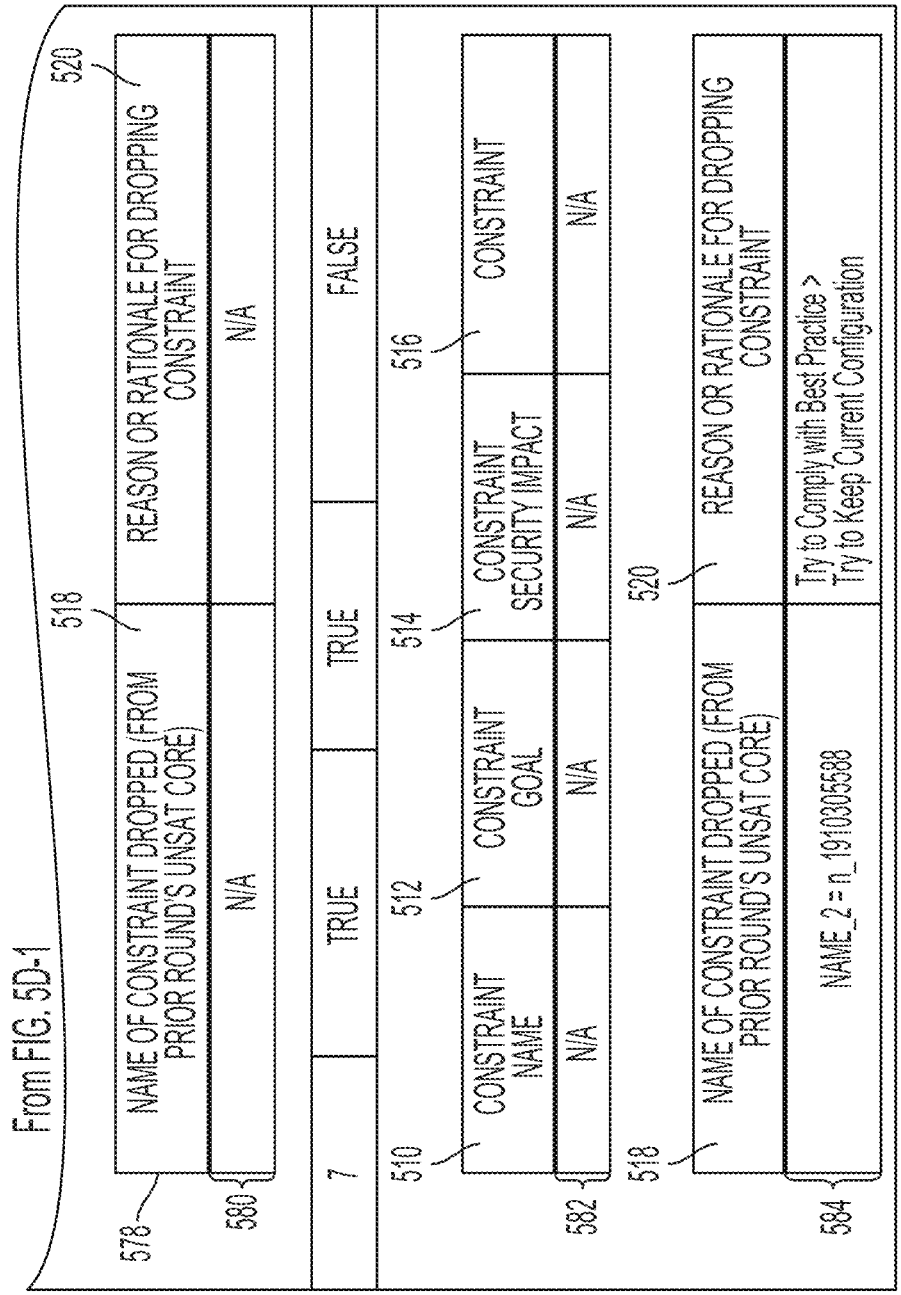

FIGS. 5D-1 and 5D-2 depict an exemplary display 570 for information in each round or iteration presented by the evidence generation framework, in accordance with an embodiment of the present application. Display 550 illustrates information from rounds subsequent to the rounds displayed in display 550. For example, in round 6, display 570 indicates that the constraints are not mutually satisfied ("FALSE"), the system does not have a model and the unsat core is not empty ("FALSE"), and the system is currently comparing a pair of mutually incompatible constraints ("TRUE"). Unsat core information 572 can include information for the pair of mutually incompatible constraints which are compared or analyzed by the system in this round (e.g., as indicated by "NAME_1" and "NAME_2"). An entry 574 corresponds to a first constraint related to a trusted proxy, with the following information: a constraint name of "NAME_1=n1312222673"; a constraint goal of "Try to Comply with Best Practice"; a constraint security impact of "50.0"; and a constraint stated as "(assert (! (not (not (=hass1.sw.http.c5ae3875_0b3a_4b34_91b6_f4403cf8424c. http.trusted_proxies"")))):named n1312222673))." An entry 576 corresponds to a second constraint related to the trusted proxy, with the following information: a constraint name of "NAME_2=n_1910305588"; a constraint goal of "Try to Keep Current Configuration"; a constraint security impact of "0.0"; and a constraint stated as "(assert (! (=hass1.sw. http.c5ae3875_0b3a_4b34_91b6_f4403cf8424c.http.trusted_proxies "(none)":named n_1910305588))."

Relaxed constraint information 578 can include an entry 580 with no information (indicated as "N/A").

In round 7, display 570 indicates that the constraints are mutually satisfied ("TRUE"), the system does have a model and the unsat core is empty ("TRUE"), and the system is not currently comparing a pair of mutually incompatible constraints ("FALSE"). Unsat core information can include an entry 582 with no information (indicated with "N/A"). Relaxed constraint information can include an entry 584 which includes: a name of the constraint dropped (from the prior round's unsat core) of "NAME_2=n_1910305588"; and a reason or rationale for dropping the constraint which indicates that the system prioritizes "Try to Comply with Best Practice" over (i.e., ">") "Try to Keep Current Configuration."

Entry 584 (and similarly, entries 564 and 544) can also include information related to the comparison of the security impact of the pair of mutually incompatible constraints. For example, in round 6, removing the first constraint for NAME_1 (indicated in entry 572) with a security impact of "50.0" can result in an increase of 50.0 in the calculated security impact if system determines to remove the first constraint, while removing the second constraint for NAME_2 (indicated in entry 576) can result in no increase (i.e., an increase of 0.0) in the calculated security impact. Calculating the security impact of constraints (e.g., associated with one or more attack paths in the multi-layer graph) is described in U.S. patent application Ser. No. 16/918,971.

Figure 6:
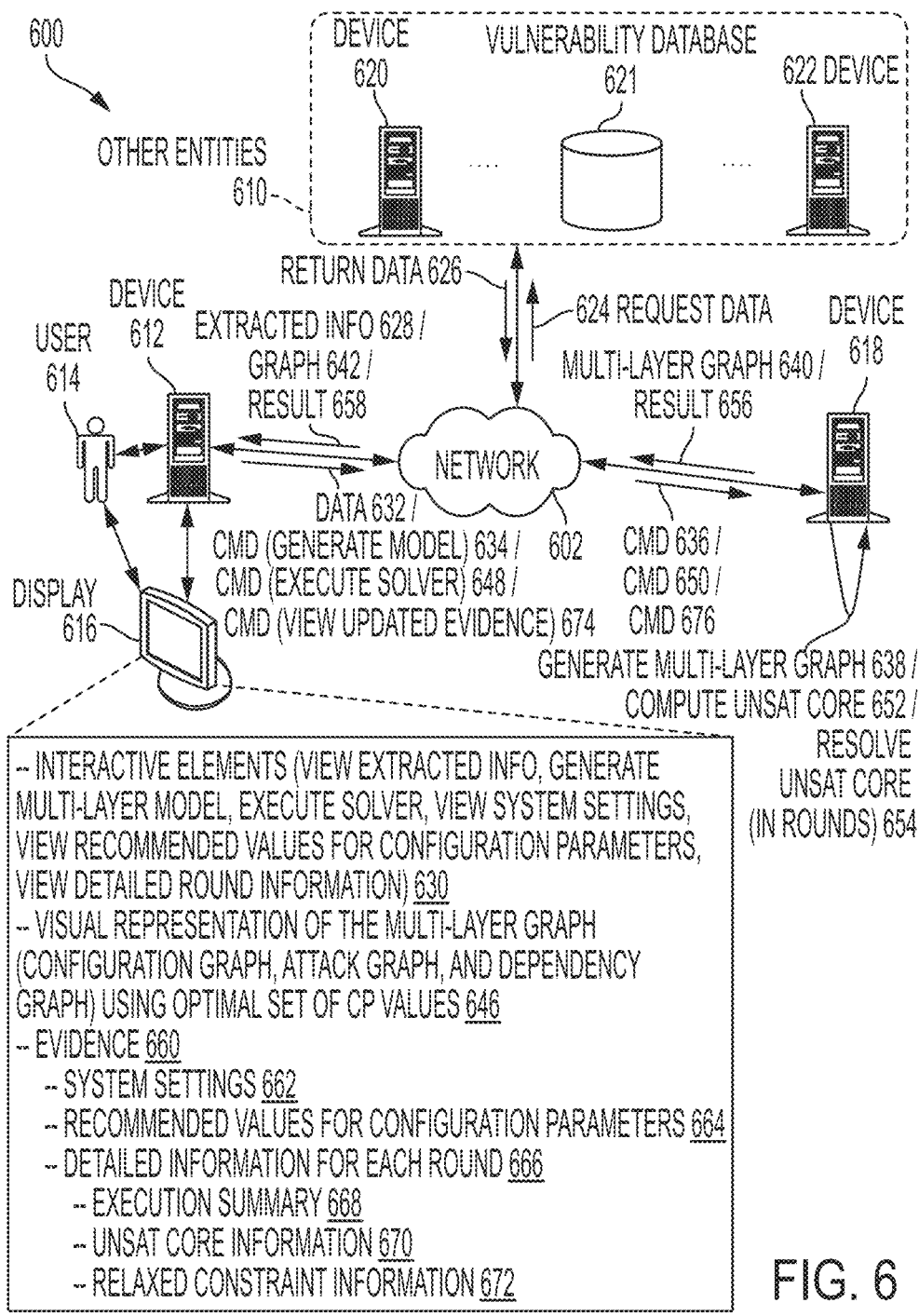
FIG. 6 depicts an exemplary environment for generating evidence for the superiority of a distributed system configuration, in accordance with an embodiment of the present application.

Exemplary Environment for Generating Evidence for Recommended Configuration Parameter Values of a Distributed System FIG. 6 depicts an exemplary environment 600 for generating evidence for the superiority of a distributed system configuration, in accordance with an embodiment of the present application. Environment 600 can include: a device 612, an associated user 614, and an associated display 616; other entities 610; and a device 618. Other entities 610 can include a plurality of devices and data stored in the plurality of devices, e.g., a device 620 (which can include an associated storage device, not shown), a vulnerability database 621 (e.g., NVD), and a device 622. Other entities 610 can also include data determined by or obtained from IoT search engines, such as Shodan (not shown) and other public or proprietary databases. Devices 612 and 618 can communicate with each other and with other entities 610 via a network 602. Device 618 can be a server, a computing/computer system, a computing device, or any device which can perform the functions described herein.

During operation, device 612 or device 618 (or another device, not shown) can send a command to request data 624 from other entities 610. Other entities 610 can return the requested data (via a return data 526 communication). As described in U.S. patent application Ser. No. 16/918,966, upon receiving the requested data, device 618 can ingest the data, normalize the ingested data, and extract information from the ingested data. Device 618 can return the extracted information (as extracted information 628) to, e.g., a requesting host or client or user.

Device 612 can receive extracted information 628, and can display on the screen of display 616 interactive elements 630 (which allow user 614 to, e.g., view the extracted information and generate the multi-layer model). User 614 can select an interactive element on display 616, which corresponds to a command to generate the multi-layer module. For example, user 614 can send a command 634 (to generate the multi-layer model) along with data 632 (i.e., extracted information 628) to device 618 via network 602. Device 618 can receive command 634 (as a command 636), and generate a multi-layer graph 638, as described in U.S. patent application Ser. No. 16/918,971. Device 618 can return a multi-layer graph 640 back to device 612.

Device 612 can receive graph 640 (as a graph 642), and can display on the screen of display 616 at least: interactive elements 630 (which allow the user to, e.g., execute the solver); and a visual representation of the multi-layer graph (configuration graph, attack graph, and dependency graph) using an optimal set of configuration parameter values 646.

User 614 can select an interactive element on display 616, which corresponds to a command 648 to execute the solver. Device 618 can receive command 648 (as a command 650), and perform the following operations: compute the unsat core 652; and resolve the unsat core 654 (in multiple rounds and based on a predefined strategy). Device 618 can return a result 656 back to device 612.

Device 612 can receive result 656 (as a result 658), and can display on the screen of display 616 at least: interactive elements 630 (which allow the user to, e.g., view system settings, view recommended values for configuration parameters, and view detailed round information); and evidence 660. Evidence 660 can be presented as a standalone document (e.g., a word document with active links to directories or other information as described above in relation to FIGS. 4A, 4C-4E, and 5A-5D) or as text or images on display 616. Evidence 660 can include: system settings 662 (as in FIG. 4A) and graph-related information (not shown) (as in FIG. 4C); recommended values for configuration parameters 664 (as in FIGS. 4D-4E); and detailed information for each round 666. As described above in relation to FIGS. 5A-5D, detailed information for each round 666 can include: an execution summary 668; unsat core information 670; and relaxed constraint information 672.

User 614 can continue to receive extracted information, view the extracted information, send commands to generate the multi-layer model for display, and view the generated multi-layer graph. User 614 can also review any recommended or changed constraints or configuration parameters, which can be displayed on display 616. User 614 can continue to send commands to re-generate the multi-layer graph based on updated constraints and configuration parameters, as recommended by the system or as set by the user, and further based on updated system settings (e.g., based on an operational context associated with the distributed system).

User 614 can continue to send these commands, which causes the solver to perform additional reasoning rounds, based on the re-generated multi-layer graph and the updated system settings. For example, user 614 can configure a change to a system setting (as in FIG. 4A) or update a configuration parameter value (e.g., accept a recommended value as depicted in FIGS. 4D and 4E), and can send a command (to view updated evidence) 674. Device 618 can receive command 674 (as a command 676), perform operations 638, 652, and 654 again based on the changed system or updated configuration parameter value, and return a correspondingly updated result 656.

Thus, environment 600 depicts the evidence generation framework within the context of the overall system, which includes the generation of result 658 as the output of the reasoning framework, and the subsequent display of result 658 on display 616 as evidence 660 (as depicted above in relation to FIGS. 4A-4E and 5A-5D).

Figure 7A:
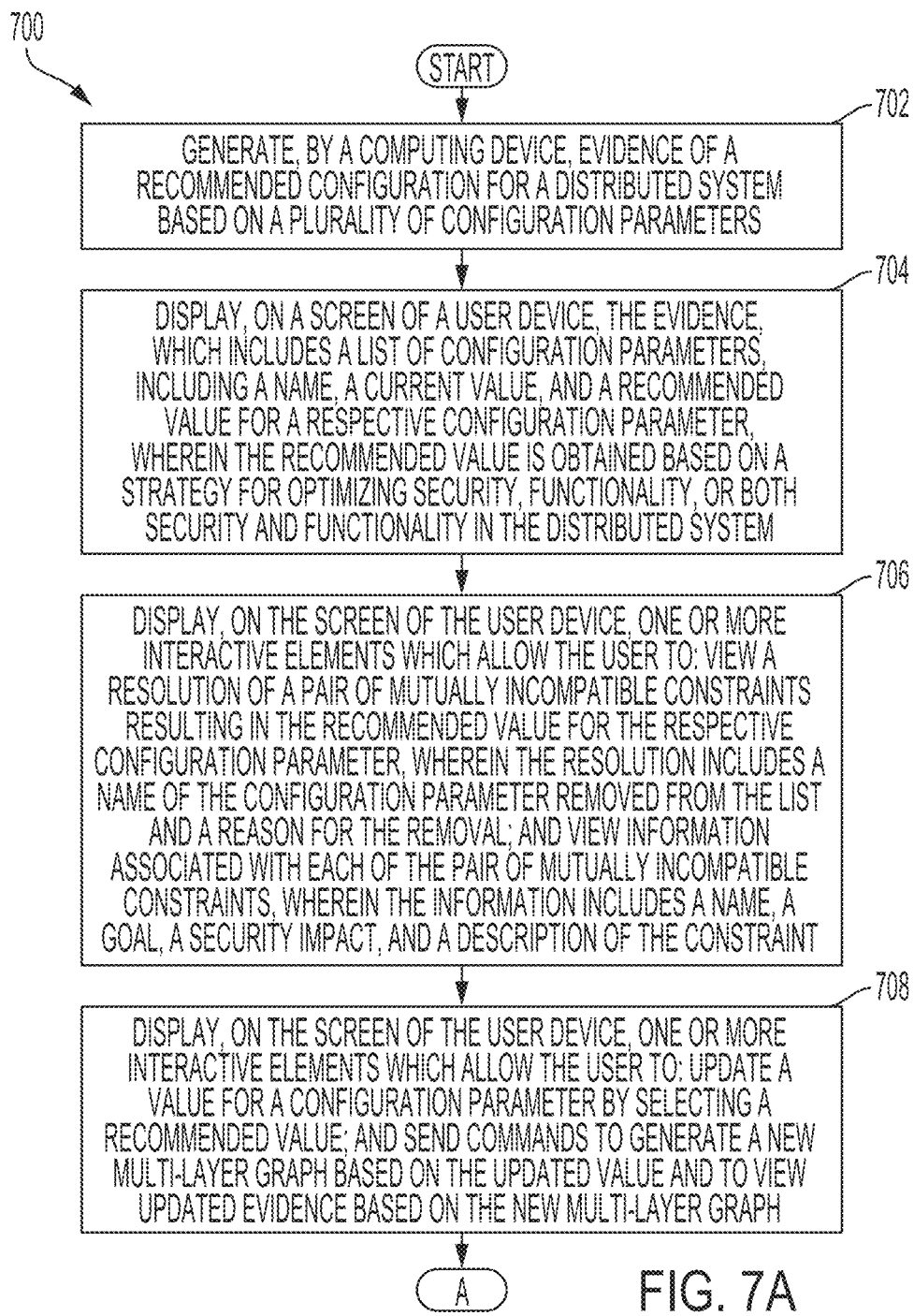
FIG. 7A presents a flow chart illustrating a method for generating evidence for the superiority of a distributed system configuration, in accordance with an embodiment of the present application.

Exemplary Method for Generating Evidence for Recommended Configuration Parameter Values of a Distributed System FIG. 7A presents a flow chart 700 illustrating a method for generating evidence for the superiority of a distributed system configuration, in accordance with an embodiment of the present application. During operation, the system generates evidence of a recommended configuration for a distributed system based on a plurality of configuration parameters (operation 702). The system displays, on a screen of a user device, the evidence, which includes a list of configuration parameters, including a name, a current value, and a recommended value for a respective configuration parameter, wherein the recommended value is obtained based on a strategy for optimizing security, functionality, or both security and functionality in the distributed system (operation 704). The system displays, on the screen of the user device, one or more interactive elements which allow the user to: view a resolution of a pair of mutually incompatible constraints resulting in the recommended value for the respective configuration parameter, wherein the resolution includes a name of the configuration parameter removed from the list and a reason for the removal; and view information associated with each of the pair of mutually incompatible constraints, wherein the information includes a name, a goal, a security impact, and a description of the constraint (operation 706). The system also displays, on the screen of the user device, one or more interactive elements which allow the user to: update a value for a configuration parameter by selecting a recommended value; and send commands to generate a new multi-layer graph based on the updated value to view updated evidence based on the new multi-layer graph (operation 708). The operation continues at Label A of FIG. 7B.

Figure 7B:
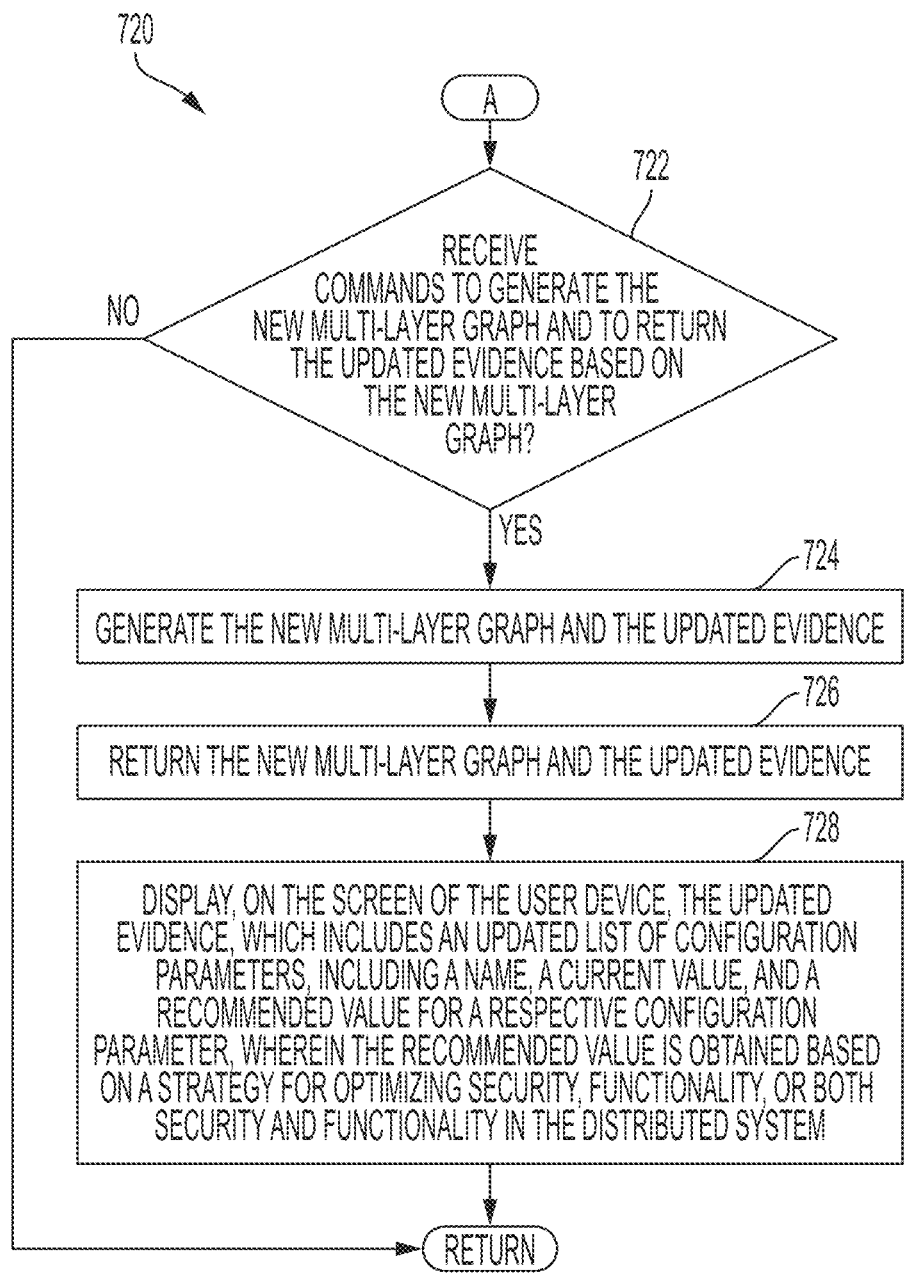
FIG. 7B presents a flow chart illustrating a method for generating evidence for the superiority of a distributed system configuration, in accordance with an embodiment of the present application.

FIG. 7B presents a flow chart 720 illustrating a method for generating evidence for the superiority of a distributed system configuration, in accordance with an embodiment of the present application. During operation, if the system does not receive commands to generate the new multi-layer graph and to return the updated evidence based on the new multi-layer graph (decision 722), the operation returns.

If the system receives commands to generate the new multi-layer graph and to return the updated evidence based on the new multi-layer graph (decision 722), the system generates the new multi-layer graph and the updated evidence (operation 724). The system displays, on the screen of the user device, the updated evidence, which includes a list of configuration parameters, including a name, a current value, and a recommended value for a respective configuration parameter, wherein the recommended value is obtained based on a strategy for optimizing strategy, functionality, or both security and functionality in the distributed system (operation 728). The operation returns.

No Known Approaches for the Described Functions/Embodiments; Improvements to Functioning of Computer; Improvements to Technical Fields There are currently no known systems or approaches for achieving or performing the above-described functions or embodiments. While current approaches may provide information about security vulnerabilities present in the configurations of individual components of a composed system, there is currently no known system or approach which provides a way to optimize the configuration so as to improve the overall security/functionality balance of the entire system. Specifically, there is currently no established way to extract configuration parameter values and normalize them for ingestion into the configuration graph. Furthermore, there are currently no known principled approaches to extract and define constraint relationships between configuration parameters of the same device, or of different devices, and to expose these relationships to an optimization algorithm.

Moreover, there are currently no known approaches which use a solver to optimize configurations of composed IoT systems or other distributed systems. There are also no known approaches which address situations in which the solver determines that certain constraints are mutually incompatible, and subsequently relaxes some of the mutually incompatible constraints based on a strategy (such as prioritizing functionality over security, prioritizing security over functionality, or neither), where the strategy is based on an operational context of the distributed system. That is, there is currently no known approach to achieve a user-configured or system-configured balance between security and functionality in a composed system (e.g., a distributed system with a plurality of components).

Furthermore, while some preliminary approaches to evidence generation currently exist, these approaches generally rely on mining security databases (such as the National Vulnerabilities Database (NVD)) to determine vulnerabilities which may be present in individual devices, inform an operator about the severity of any such vulnerabilities, and recommend which vulnerabilities to address first.

In contrast, the embodiments described herein provide a system which can inform an operator about a much broader spectrum of vulnerabilities, related not just to those in the above-mentioned vulnerability database, but also related to security best practice and bad practices. Furthermore, the generated evidence is generated as output from the reasoning framework, which uses a solver to compute a new configuration for the distributed system, across all components of the distributed system, by preserving functionality or security or both, based on an operational context of the distributed system. The solver of the reasoning framework can compute the new configuration over multiple iterations by resolving an unsatisfiable core of mutually incompatible constraints, as described above in relation to U.S. patent application Ser. No. 16/923,763.

The evidence generation framework provides the user with a graphical user interface, via which the outputted information can be returned and on which the evidence may be displayed, as described above in relation to FIGS. 4A-4E and 5A-5D. The evidence generation framework can generate and display this information, along with providing interactive user elements which allow the user to re-run operations of the other frameworks to view updated evidence, as described above in relation to FIG. 7B. The evidence generation framework can provide the generated information, as well as display the multi-layer graph constructed by the modeling framework and the information extracted by the data ingestion framework.

Given a composed system (such as an IoT system), the embodiments described herein can optimize the configuration of the system components by leveraging the complex relationships among the configuration parameters of the individual system components, which can result in improving the overall security and functionality balance of the entire system. Furthermore, the embodiments described herein provide an improvement over the existing state of the art in the computer technology field of providing security for a system of networked components, and also for optimizing the provided security.

The disclosed system includes a system of networked components (e.g., a composed system which is an IoT system), where each component may be a computing device with different configuration parameters and which may interact differently with the other networked components (or computing devices). Each component may also have different security and functionality parameters. The disclosed system is thus directed to a solution which is both necessarily rooted in computer technology and provides a specific implementation of a solution to a problem in the software arts. Furthermore, the disclosed system can enhance the functioning of the computer system itself, because optimizing the configuration of the system components can improve the balance between the security and the functionality of the overall composed system, which necessarily enhances the functioning of each individual networked component in the overall system. By providing a more secure system which is less prone to attack, the described embodiments can thus enhance the functioning of the computer system itself (as well as the networked components of the composed system), in terms of security, performance, and efficiency.

Furthermore, the described embodiments may be integrated into many different practical applications, e.g., used in many technical fields and for many different applications. Some exemplary systems include: a home IoT security system; a smart grid and microgrid security system; security relating to Navy ships, military aircraft, and Department of Defense (DoD) systems; security of networked critical infrastructure, such as dams, hospitals, and transportation networks; and enterprise security for networks of computers, printers, and mobile devices. Examples of primary users include: operators of DoD systems; operators and system administrators of distributed system and enterprise networks; security and information technology (IT) administrators for medium-to-large enterprises; and any users of the above listed exemplary systems.

Thus, the improvements provide by the disclosed system apply to several technologies and technical fields, including but not limited to: security of networked components; configuration security; cyber-physical system security; balancing security and functionality of networked components in an IoT system; and machine data analytics.

Exemplary Computer and Communication System

Figure 8:
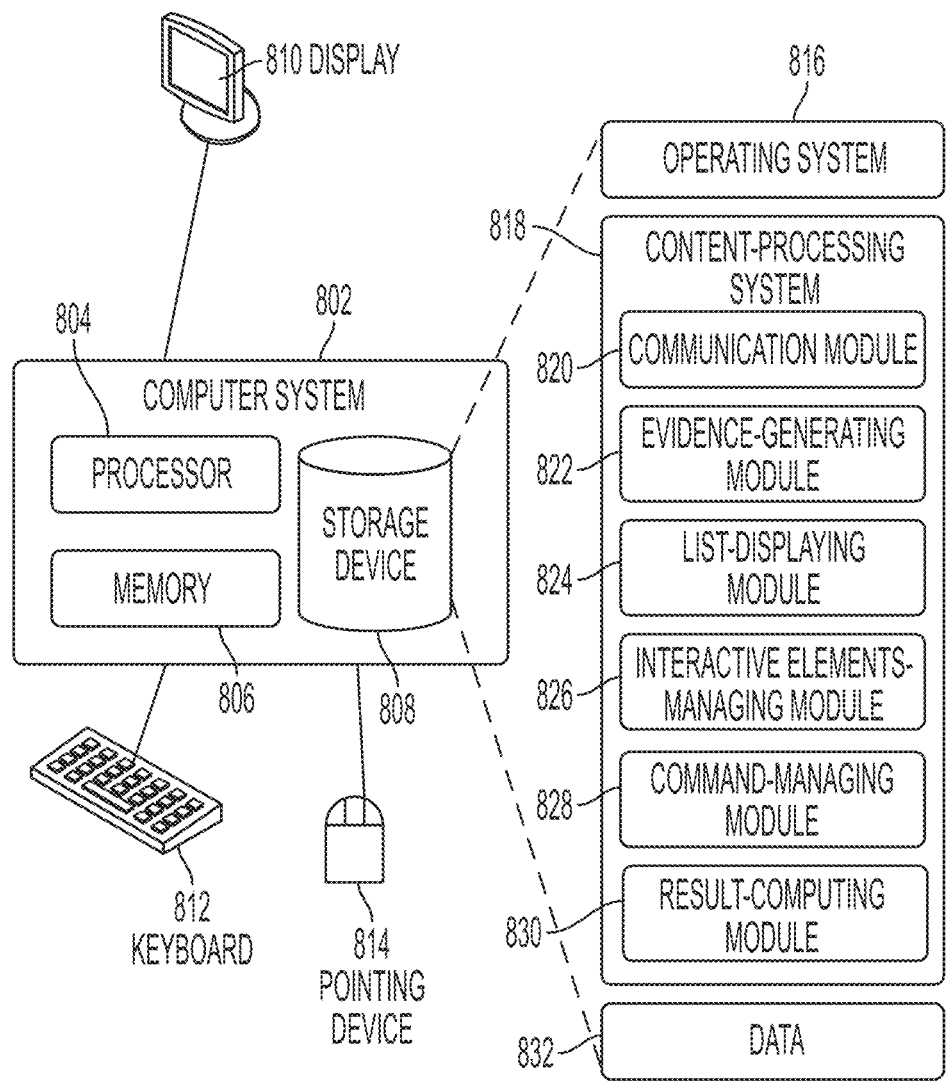
FIG. 8 illustrates an exemplary computer and communication system that facilitates generating evidence for the superiority of a distributed system configuration, in accordance with an embodiment of the present application.

FIG. 8 illustrates an exemplary computer and communication system 802 that facilitates generating evidence for the superiority of a distributed system configuration, in accordance with an embodiment of the present application. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 832.

Content-processing system 818 can include instructions, which when executed by computer system 802, can cause computer system 802 to perform methods and/or processes described in this disclosure. Specifically, content-processing system 818 may include instructions for sending and/or receiving/obtaining data packets to/from other network nodes across a computer network (communication module 820). A data packet can include a request, data, configuration information, vulnerability information, dependency information, a command, a strategy, and a recommended configuration.

Content-processing system 818 can further include instructions for generating, by a computing system, evidence of a recommended configuration for a distributed system based on a plurality of configuration parameters (evidence-generating module 822). Content-processing system 818 can include instructions for displaying, on a screen of a user device, the evidence, which includes a list of configuration parameters, including a name, a current value, and a recommended value for a respective configuration parameter, wherein the recommended value is obtained based on a strategy for optimizing security, functionality, or both security and functionality in the distributed system (list-displaying module 824). Content-processing system 818 can also include instructions for displaying, on the screen of the user device, one or more interactive elements which allow the user to: view a resolution of a pair of mutually incompatible constraints resulting in the recommended value for the respective configuration parameter, wherein the resolution includes a name of the configuration parameter removed from the list and a reason for the removal; and view information associated with each of the pair of mutually incompatible constraints, wherein the information includes a name, a goal, a security impact, and a description of the constraint (interactive-elements managing module 826 and command-managing module 828).

Content-processing system 818 can additionally include instructions for displaying, on the screen of the user device, one or more interactive elements which allow the user further to: update a value for a configuration parameter by selecting a recommended value; generate a new multi-layer graph based on the updated value; and view updated evidence based on the new multi-layer graph (interactive-elements managing module 826 and command-managing module 828).

Content-processing system 818 can additionally include instructions for receiving a command to generate a new multi-layer graph and to return updated evidence, wherein the command indicates one or more updated values for one or more configuration parameters (communication module 820 and command-managing module 828). Content-processing system 818 can include instructions for generating the new multi-layer graph and the updated evidence based on the one or more updated values (result-computing module 830). Content-processing system 818 can include instructions for returning the new multi-layer graph and the updated evidence (communication module 820). Content-processing system 818 can include instructions for displaying, on the screen of the user device, the updated evidence, which includes: an updated list of configuration parameters, including a name, a current value, and a recommended value for a respective configuration parameter, wherein the recommended value is obtained based on a strategy for optimizing security, functionality, or both security and functionality in the distributed system (evidence-generating module 822 and list-displaying module 824).

Data 832 can include any data that is required as input or that is generated as output by the methods and/or processes described in this disclosure. Specifically, data 832 can store at least: data; a command; a request; an indicator or identifier of a configuration subgraph, a dependency subgraph, or a vulnerability node; a configuration subgraph node, a dependency subgraph node, or a vulnerability subgraph node; a directed edge in a subgraph; a directed edge between subgraphs; a configuration parameter; a configuration constraint; a security constraint; a functionality constraint; an unsat core; a set of mutually incompatible constraints; a set of mutually compatible constraints; a list; an ordered list; a randomly ordered list; a strategy or policy; an algorithm; encoded information; a name; a default value; a range of values; a data type; a first or a second class of nodes; a relationship; a known vulnerability; an identifier or indicator of a component, a bad security practice, or a best security practice; a name; a current value; a recommended value; an indicator of an interactive element on a graphical user interface; an unsatisfiable core; a resolution of a pair of mutually incompatible constraints; a name of a configuration parameter removed from a list or dropped from a pair of mutually incompatible constraints; a reason for the removal; a constraint name; a constraint goal; a security impact of a constraint; a description of a constraint; an updated value for a configuration parameter; a multi-layer graph; evidence; updated evidence; an updated multi-layer graph; an array; system settings; a maximum number of reasoning rounds; a fully qualified domain name; an indicator of a framework or application for generating the multi-layer graph; an identifier of a directory; a number corresponding to a respective round; a number of rounds; an indicator of a failure to produce an empty unsat core; and a result of resolving the unsat core.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
generating, by a computing system, evidence of a recommended configuration for a distributed system based on a plurality of configuration parameters;
displaying, on a screen of a user device, the evidence, which includes a list of configuration parameters, including, for a respective configuration parameter: a name; a current value; and a recommended value which is obtained based on a predefined strategy for optimizing security, functionality, or both security and functionality in the distributed system,
wherein the current value for the respective configuration parameter comprises a first array with current or possible values for the respective configuration parameter used by the distributed system, and
wherein the recommended value for the respective configuration parameters comprises a second array with recommended values for the respective configuration parameter suggested by the computing system; and
displaying, on the screen of the user device, one or more interactive elements which allow the user to:
view a resolution of a pair of mutually incompatible constraints resulting in the recommended value for the respective configuration parameter, wherein the resolution includes a name of the configuration parameter removed from the list and a reason for the removal; and
view information associated with each of the pair of mutually incompatible constraints, wherein the information includes a name, a goal, a security impact, and a description of the constraint.

2. The method of claim 1,
wherein the second array has fewer elements than the first array.

3. The method of claim 1,
wherein the strategy for optimizing security comprises preserving constraints which prioritize security over functionality,
wherein the strategy for optimizing functionality comprises preserving constraints which prioritize functionality over security, and
wherein the strategy for optimizing both security and functionality comprises improving a current configuration of the system without prioritizing security over functionality or functionality over security.

4. The method of claim 1,
wherein the reason for removal of the configuration parameter from the pair of mutually incompatible constraints is based on the strategy, the goal of the constraint, and the security impact of the constraint.

5. The method of claim 1, wherein the reason for removal comprises one or more of:
a preference for a security best practice;
an avoidance of a security bad practice;
an avoidance of known security or system vulnerabilities; and
a security policy or preference which is predetermined by an operator of the computing system or the distributed system.

6. The method of claim 1, wherein the method further comprises displaying, on the screen of the user device, system settings, including one or more of:
 a maximum number of reasoning rounds;
 a fully qualified domain name of a framework used for generating a multi-layer graph;
 a framework or application used for generating the multi-layer graph;
 a strategy for relaxing constraints; and
 one or more output or reporting directories.

7. The method of claim 1,
 wherein generating the evidence is based on a multi-layer graph which is obtained for the distributed system with a plurality of components, and
 wherein the multi-layer graph comprises a configuration subgraph, a vulnerability subgraph, and a dependency subgraph.

8. The method of claim 7, further comprising:
 displaying, on the screen of the user device, one or more interactive elements which allow the user further to:
  update a value for a configuration parameter by selecting a recommended value;
  generate a new multi-layer graph based on the updated value; and
  view updated evidence based on the new multi-layer graph.

9. The method of claim 7, further comprising:
 receiving a command to generate a new multi-layer graph and to return updated evidence, wherein the command indicates one or more updated values for one or more configuration parameters;
 generating the new multi-layer graph and the updated evidence based on the one or more updated values;
 returning the new multi-layer graph and the updated evidence; and
 displaying, on the screen of the user device, the updated evidence, which includes an updated list of configuration parameters, including a name, a current value, and a recommended value for a respective configuration parameter, wherein the recommended value is obtained based on a strategy for optimizing security, functionality, or both security and functionality in the distributed system.

10. The method of claim 1, further comprising:
 computing an unsatisfiable core to obtain the mutually incompatible constraints; and
 displaying, on the screen of the user device, a resolution of the computed unsatisfiable core, based on the strategy and over multiple iterations,
 wherein the resolution is obtained by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

11. A computer system, the system comprising:
 a processor; and
 a storage device storing instructions that when executed by the processor cause the processor to perform a method, the method comprising:
 generating, by the computer system, evidence of a recommended configuration for a distributed system based on a plurality of configuration parameters;
 displaying, on a screen of a user device, the evidence, which includes a list of configuration parameters, including, for a respective configuration parameter: a name; a current value; and a recommended value which is obtained based on a predefined strategy for optimizing security, functionality, or both security and functionality in the distributed system,
 wherein the current value for the respective configuration parameter comprises a first array with current or possible values for the respective configuration parameter used by the distributed system, and
 wherein the recommended value for the respective configuration parameters comprises a second array with recommended values for the respective configuration parameter suggested by the computing system; and
 displaying, on the screen of the user device, one or more interactive elements which allow the user to:
  view a resolution of a pair of mutually incompatible constraints resulting in the recommended value for the respective configuration parameter, wherein the resolution includes a name of the configuration parameter removed from the list and a reason for the removal; and
  view information associated with each of the pair of mutually incompatible constraints, wherein the information includes a name, a goal, a security impact, and a description of the constraint.

12. The computer system of claim 11,
 wherein the second array has fewer elements than the first array.

13. The computer system of claim 11,
 wherein the strategy for optimizing security comprises preserving constraints which prioritize security over functionality,
 wherein the strategy for optimizing functionality comprises preserving constraints which prioritize functionality over security, and
 wherein the strategy for optimizing both security and functionality comprises improving a current configuration of the system without prioritizing security over functionality or functionality over security.

14. The computer system of claim 11,
 wherein the reason for removal of the configuration parameter from the pair of mutually incompatible constraints is based on the strategy, the goal of the constraint, and the security impact of the constraint.

15. The computer system of claim 11, wherein the reason for removal comprises one or more of:
 a preference for a security best practice;
 an avoidance of a security bad practice;
 an avoidance of known security or system vulnerabilities; and
 a security policy or preference which is predetermined by an operator of the computing system or the distributed system.

16. The computer system of claim 11, wherein the method further comprises displaying, on the screen of the user device, system settings, including one or more of:
 a maximum number of reasoning rounds;
 a fully qualified domain name of a framework used for generating a multi-layer graph;
 a framework or application used for generating the multi-layer graph;
 a strategy for relaxing constraints; and
 one or more output or reporting directories.

17. The computer system of claim 11,
 wherein generating the evidence is based on a multi-layer graph which is obtained for the distributed system with a plurality of components, wherein the multi-layer graph comprises a configuration subgraph, a vulnerability subgraph, and a dependency subgraph, and wherein the method further comprises:
displaying, on the screen of the user device, one or more interactive elements which allow the user further to:
update a value for a configuration parameter by selecting a recommended value;
generate a new multi-layer graph based on the updated value; and
view updated evidence based on the new multi-layer graph.

18. The computer system of claim 17, wherein the method further comprises:
receiving a command to generate a new multi-layer graph and to return updated evidence, wherein the command indicates one or more updated values for one or more configuration parameters;
generating the new multi-layer graph and the updated evidence based on the one or more updated values;
returning the new multi-layer graph and the updated evidence; and
displaying, on the screen of the user device, the updated evidence, which includes an updated list of configuration parameters, including a name, a current value, and a recommended value for a respective configuration parameter, wherein the recommended value is obtained based on a strategy for optimizing security, functionality, or both security and functionality in the distributed system.

19. The computer system of claim 11, wherein the method further comprises:
computing an unsatisfiable core to obtain the mutually incompatible constraints; and
displaying, on the screen of the user device, a resolution of the computed unsatisfiable core, based on the strategy and over multiple iterations,
wherein the resolution is obtained by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

20. A non-transitory computer-readable storage medium storing instructions that when executed by a computer cause the computer to perform a method, the method comprising:
generating, by the computer, evidence of a recommended configuration for a distributed system based on a plurality of configuration parameters;
displaying, on a screen of a user device, the evidence, which includes a list of configuration parameters, including, for a respective configuration parameter: a name; a current value; and a recommended value which is obtained based on a strategy for optimizing security, functionality, or both security and functionality in the distributed system,
wherein the current value for the respective configuration parameter comprises a first array with current or possible values for the respective configuration parameter used by the distributed system, and
wherein the recommended value for the respective configuration parameters comprises a second array with recommended values for the respective configuration parameter suggested by the computing system; and
displaying, on the screen of the user device, one or more interactive elements which allow the user to:
view a resolution of a pair of mutually incompatible constraints resulting in the recommended value for the respective configuration parameter, wherein the resolution includes a name of the configuration parameter removed from the list and a reason for the removal; and
view information associated with each of the pair of mutually incompatible constraints, wherein the information includes a name, a goal, a security impact, and a description of the constraint.

* * * * *